(12) United States Patent
Sturman et al.

(10) Patent No.: US 6,415,749 B1
(45) Date of Patent: Jul. 9, 2002

(54) POWER MODULE AND METHODS OF OPERATION

(76) Inventors: Oded E. Sturman, One Innovation Way, Woodland Park, CO (US) 80863; Richard J. Dunn, 128 Valley Cir., Florissant, CO (US) 80816

( * ) Notice: Subject to any disclaimer, the term of this patent is extended or adjusted under 35 U.S.C. 154(b) by 0 days.

(21) Appl. No.: 09/301,004

(22) Filed: Apr. 27, 1999

(51) Int. Cl.[7] .............................. F02B 33/22; F01L 9/02
(52) U.S. Cl. ................................. 123/70 R; 123/90.12; 123/446
(58) Field of Search .................. 123/66, 68, 70 R, 123/71 R, 472, 90.12, 90.14, 90.15, 559.1, 564, 565, 460, 446; 60/517

(56) References Cited

U.S. PATENT DOCUMENTS

| 4,009,695 A | | 3/1977 | Ule .......................... 123/90.13 |
| 4,162,662 A | | 7/1979 | Melchior ................ 123/65 DV |
| 4,326,380 A | | 4/1982 | Rittmaster et al. ............. 60/595 |
| 5,237,968 A | | 8/1993 | Miller et al. .............. 123/90.11 |
| 5,275,134 A | * | 1/1994 | Springer ...................... 123/42 |
| 5,499,605 A | * | 3/1996 | Thring ...................... 123/70 R |
| 5,526,778 A | * | 6/1996 | Springer ...................... 123/42 |
| 5,857,436 A | * | 1/1999 | Chen ........................ 123/70 R |
| 5,894,730 A | | 4/1999 | Mitchell ...................... 60/595 |
| 5,954,030 A | | 9/1999 | Sturman et al. ............. 123/446 |
| 5,960,753 A | | 10/1999 | Sturman .................. 123/90.12 |
| 5,970,956 A | | 10/1999 | Sturman ...................... 123/508 |
| 6,005,763 A | | 12/1999 | North ........................ 361/154 |
| 6,012,644 A | | 1/2000 | Sturman et al. ............... 239/96 |
| 6,105,616 A | | 8/2000 | Sturman et al. ........ 137/625.65 |
| 6,109,284 A | | 8/2000 | Johnson et al. ................ 137/1 |
| 6,148,778 A | | 11/2000 | Sturman .................. 123/90.12 |
| 6,173,685 B1 | | 1/2001 | Sturman .................. 123/90.12 |

FOREIGN PATENT DOCUMENTS

| DE | 37 27 335 A1 | 2/1988 | .......... F02B/71/00 |
| GB | 941453 | 11/1963 | |
| WO | WO 98/11334 A | 3/1998 | |

* cited by examiner

Primary Examiner—Willis R. Wolfe
Assistant Examiner—Hai Huynh

(57) ABSTRACT

Herein disclosed is a power module comprising an air compressor chamber, an air supply valve operable to control air flow to the air compressor chamber, a combustion chamber separate from the air compressor chamber, an air storage chamber arranged between the air compressor chamber and the combustion chamber, an actuating fluid common rail, an actuating fluid compressor chamber, an actuating fluid supply valve operable to control actuating fluid flow to the actuating fluid compressor chamber, an actuating fluid storage chamber arranged between the actuating fluid compressor chamber and the actuating fluid common rail, a hydraulically-actuatable intake valve operable to control air flow to the combustion chamber, and a hydraulically-actuatable exhaust valve operable to control exhaust gas flow from the combustion chamber. Among other things, the power module provides significantly more power output than a conventional internal combustion engine of similar size.

63 Claims, 11 Drawing Sheets

POWER MODULE AND METHODS OF OPERATION

TECHNICAL FIELD

The present invention relates generally to engines or power devices and, more particularly, to internal combustion engines.

BACKGROUND ART

Many known conventional internal combustion engines typically have a camshaft for controlling the operation of engine valves such as air intake and exhaust valves. One disadvantage of this arrangement is the inherent parasitic power losses associated with camshafts as well as the relatively slow mechanical actuation of such engine valves which is fixed to engine speed. Another disadvantage is that the timing for opening and closing such engine valves is typically fixed to crankshaft and piston position and generally can be optimized for only one operating condition. Consequently, performance and emissions of the engine may be less than optimum at many other operating conditions. Other known internal combustion engines, described in technical literature, eliminate the camshaft and instead hydraulically actuate such engine valves. However, the electrical actuators used to control such engine valves are typically solenoids which still act too slow and continuously consume electrical power throughout the time such engine valves are opened. It is therefore desirable to provide higher speed of actuation, greater flexibility, and conservation of energy in the operation of such engine valves.

Some known engines have exhaust-driven turbochargers for improving the power output and efficiency of an engine. However, such turbochargers typically require complex high precision parts and are slow to respond to increased loads on the engine.

Known engines typically may shut down completely when a failure occurs. Such engine failure and shutdown may quickly lead to more catastrophic damage and/or injury if the engine is, for example, powering a moving occupied vehicle or other craft.

The present invention is directed to overcoming one or more of the problems as set forth above.

DISCLOSURE OF THE INVENTION

In one aspect of the present invention, there is disclosed a power module comprising an air compressor chamber, an air supply valve operable to control air flow to the air compressor chamber, a movable air pump piston positioned in the air compressor chamber, a combustion chamber separate from the air compressor chamber, an air storage chamber arranged in fluid communication between the air compressor chamber and the combustion chamber, an intake valve operable to control air flow from the air storage chamber to the combustion chamber, an exhaust valve operable to control exhaust gas flow from the combustion chamber, and a movable power piston positioned in the combustion chamber.

In another aspect of the present invention, there is disclosed a power module comprising a turbocharger, an air compressor chamber, a free air supply valve operable to control ambient air flow to the air compressor chamber, a turbocharged air supply valve operable to control the flow of turbocharged air from the turbocharger to the air compressor chamber, a movable air pump piston positioned in the air compressor chamber, a combustion chamber separate from the air compressor chamber, an air storage chamber arranged in fluid communication between the air compressor chamber and the combustion chamber, an intake valve operable to control air flow from the air storage chamber to the combustion chamber, a free exhaust valve operable to control exhaust gas flow from the combustion chamber to ambient, a drive exhaust valve operable to control exhaust gas flow from the combustion chamber to the turbocharger, and a movable power piston positioned in the combustion chamber.

In another aspect of the present invention, there is disclosed a power module comprising an actuating fluid compressor chamber, an actuating fluid supply valve operable to control actuating fluid flow to the actuating fluid compressor chamber, a movable actuating fluid pump piston positioned in the actuating fluid compressor chamber, an actuating fluid common rail, a combustion chamber separate from the actuating fluid compressor chamber, an actuating fluid storage chamber arranged in fluid communication between the actuating fluid compressor chamber and the actuating fluid common rail, a hydraulically-actuatable intake valve operable to control air flow to the combustion chamber, a hydraulically-actuatable exhaust valve operable to control exhaust gas flow from the combustion chamber, and a movable power piston positioned in the combustion chamber.

In another aspect of the present invention, there is disclosed a power module comprising an air compressor chamber, an air supply valve operable to control air flow to the air compressor chamber, a movable air pump piston positioned in the air compressor chamber, an actuating fluid common rail, a combustion chamber separate from the air compressor chamber, an air storage chamber arranged in fluid communication between the air compressor chamber and the combustion chamber, an actuating fluid compressor chamber, an actuating fluid supply valve operable to control actuating fluid flow to the actuating fluid compressor chamber, a movable actuating fluid pump piston positioned in the actuating fluid compressor chamber, an actuating fluid storage chamber arranged in fluid communication between the actuating fluid compressor chamber and the actuating fluid common rail, a hydraulically-actuatable intake valve operable to control air flow to the combustion chamber, a hydraulically-actuatable exhaust valve operable to control exhaust gas flow from the combustion chamber, and a movable power piston positioned in the combustion chamber.

In another aspect of the present invention, there is disclosed an internal combustion engine comprising a plurality of power modules wherein each power module includes an air compressor chamber and an air storage chamber. The air compressor chamber and air storage chamber of each power module are isolated from fluid communication and independently operable with respect to the air compressor chamber and air storage chamber of any other power module of the internal combustion engine.

In another aspect of the present invention, there is disclosed an internal combustion engine comprising a plurality of power modules wherein each power module includes an actuating fluid compressor chamber and an actuating fluid storage chamber. The actuating fluid compressor chamber and actuating fluid storage chamber of each power module are isolated from fluid communication and independently operable with respect to the actuating fluid compressor chamber and actuating fluid storage chamber of any other power module of the internal combustion engine.

In another aspect of the present invention, there is disclosed a power module including a rotatable crankshaft, combustion chamber, a movable power piston positioned in the combustion chamber, a fuel injector operable to inject fuel into the combustion chamber, a hydraulically-actuatable intake valve operable to control air flow into the combustion chamber, and a hydraulically-actuatable exhaust valve operable to control exhaust gas flow from the combustion chamber. The crankshaft is selectively rotatable in one of a first angular direction and a reverse angular direction in response to selectable operation of the intake and exhaust valves and fuel injector relative to the position of the power piston.

In another aspect of the present invention, a method of operating a power module is disclosed comprising the steps of moving a power piston from its expansion position and towards its contraction position, closing an exhaust valve, and then closing an intake valve before the power piston reaches its contraction position.

One embodiment of the subject invention provides one or more power modules that are capable of operating as a dynamically-variable (e.g., 2, 4, 6, 8, etc.) stroke cycle engine. Each power module when switched to a two-stroke engine cycle is particularly advantageous for developing more power (i.e., more work per unit time or stroke) in a relatively smaller package (e.g., fewer combustion cylinders and related components) compared to conventional two-stroke or four-stroke internal combustion engines. The selectable greater number of strokes per engine cycle of one embodiment of the subject invention are particularly advantageous for facilitating longer duration of containment of exhaust gas within the combustion chamber to ensure more complete burning of combustion byproducts.

The combustion chamber of each power module is capable of developing relatively high peak fluid pressures that result in relatively higher power output capability. During operation of the power module, the combustion chamber preferably maintains a residual or minimum fluid pressure greater than atmospheric pressure even when the power piston is at its expansion position. Such residual fluid pressure enables relatively high peak fluid pressures on subsequent engine cycles and thus greater engine efficiency. Each power module has a compressor cell for locally compressing and pumping air and actuating fluid and a separate combustion cell for the generation of power. By dividing these functions into separate cells, each cell advantageously has a larger surface area available for handling the passage of required fluids.

One embodiment of the subject power module also substitutes digitally-controlled hydraulic valve actuators for conventional camshafts. This improved arrangement provides conservation of electrical energy and greater flexibility for independent control of air, fuel, and exhaust during an engine cycle. The actuators can be dynamically controlled to selectively reverse the rotating direction of the engine crankshaft that simplifies the transmission coupled to the engine. They may also provide engine compression braking and energy recovery when deceleration is desired and/or vary the number of strokes per engine cycle. The above modular design also provide greater safety in terms of relatively low external fluid pressures, relatively low electrical voltages, and limp-home capability in the event of a localized failure. The ability of one embodiment of the subject power module or engine to dynamically vary the number of strokes per engine cycle may enable the power module to exhibit lower noxious emissions than conventional engines.

BEST MODE FOR CARRYING OUT THE INVENTION

Referring to FIGS. 1–17, wherein similar reference numbers or characters designate similar elements or features throughout the Figs., there is shown an exemplary embodiment of an improved environmental and improved performance internal combustion engine 10 of the present invention. The engine is shown as adapted for a direct-injection dynamically variable-stroke (e.g., 2, 4, 6, 8, etc.) stroke diesel-cycle reciprocating internal combustion engine. However, it should be understood that the present invention is also applicable to other types of engines, including but not limited to, indirect injection engines, rotary engines, and modified-cycle engines.

Figure 1:
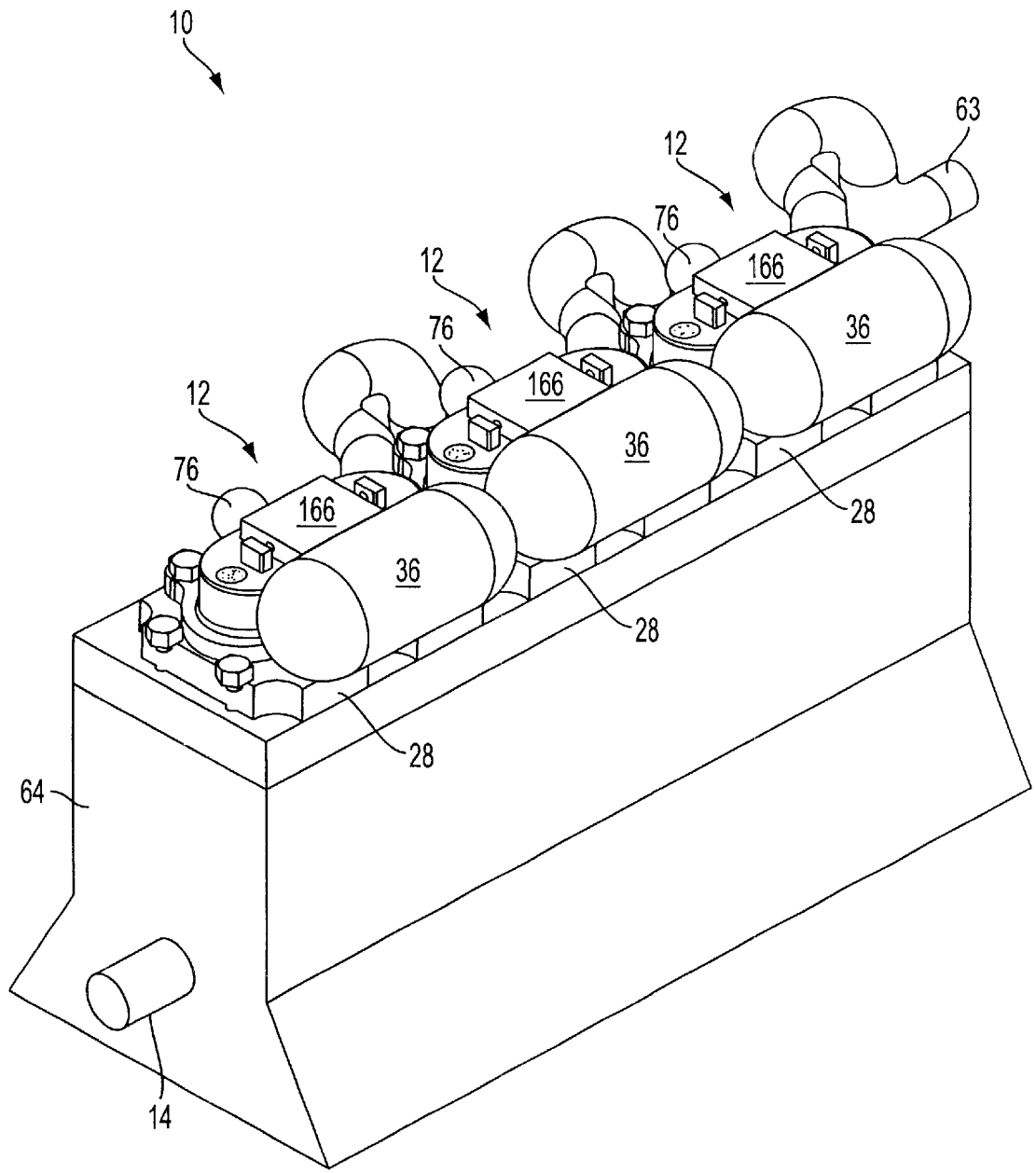
FIG. 1 is a perspective view of an improved internal combustion engine incorporating multiple power modules of the present invention.
Figure 2:
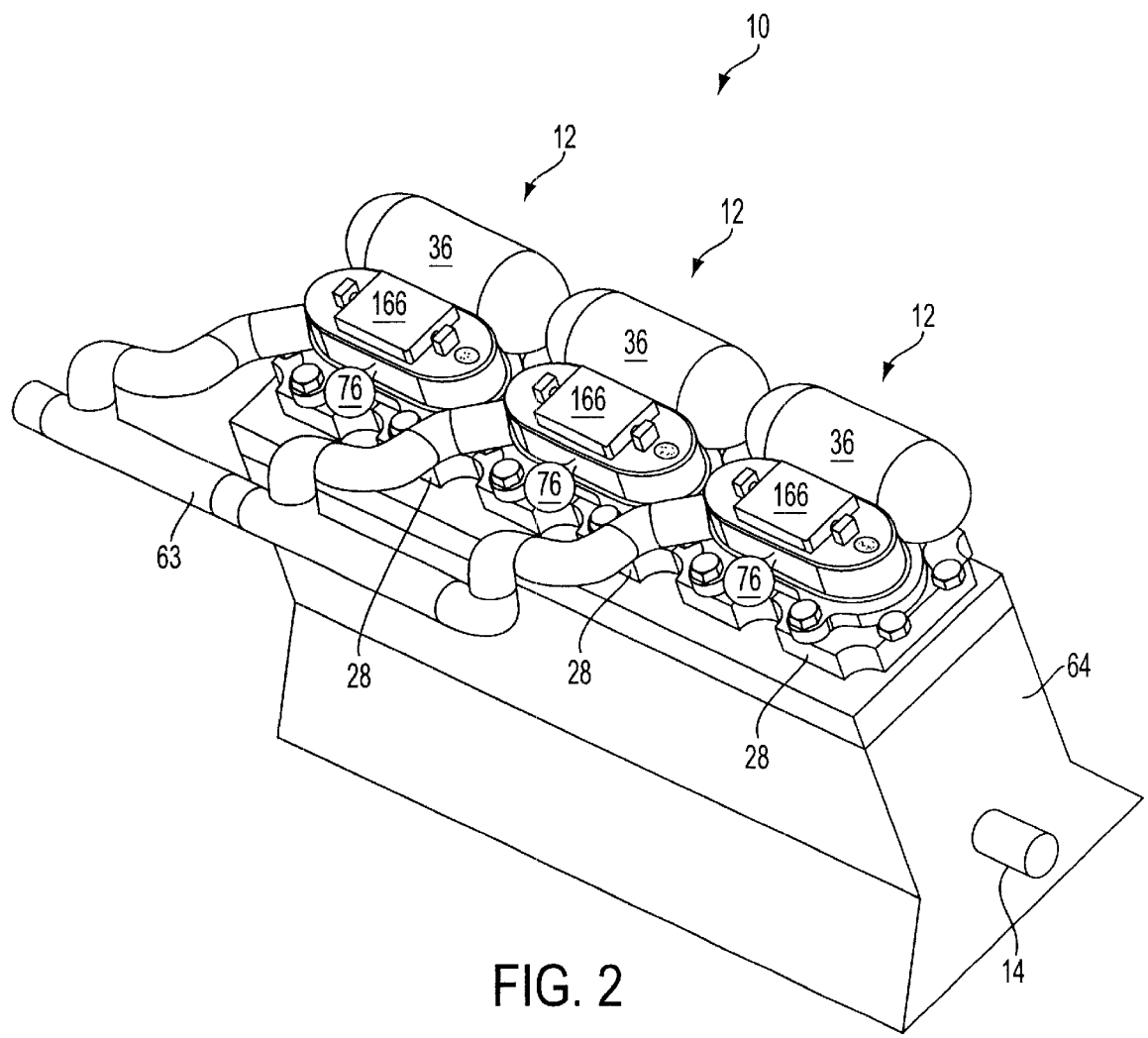
FIG. 2 is a view taken from a different perspective of FIG. 1.

As shown in FIGS. 1–2, the engine 10 includes at least one power module 12 and a drive device such as a rotatable crankshaft 14. Alternatively, the drive device may be a hydraulic motor. In the embodiment of FIGS. 1–2, the engine 10 has a plurality of power modules 12, totaling three for example, that are connected to generate work together. However, the engine may have more or less power modules than the illustrated amount. In the embodiment shown, the power modules are arranged substantially in-line relative to one another. Alternatively, the power modules of the engine may be arranged in other patterns or orientations relative to one another such a vee-patterns or opposed patterns.

Figure 6:
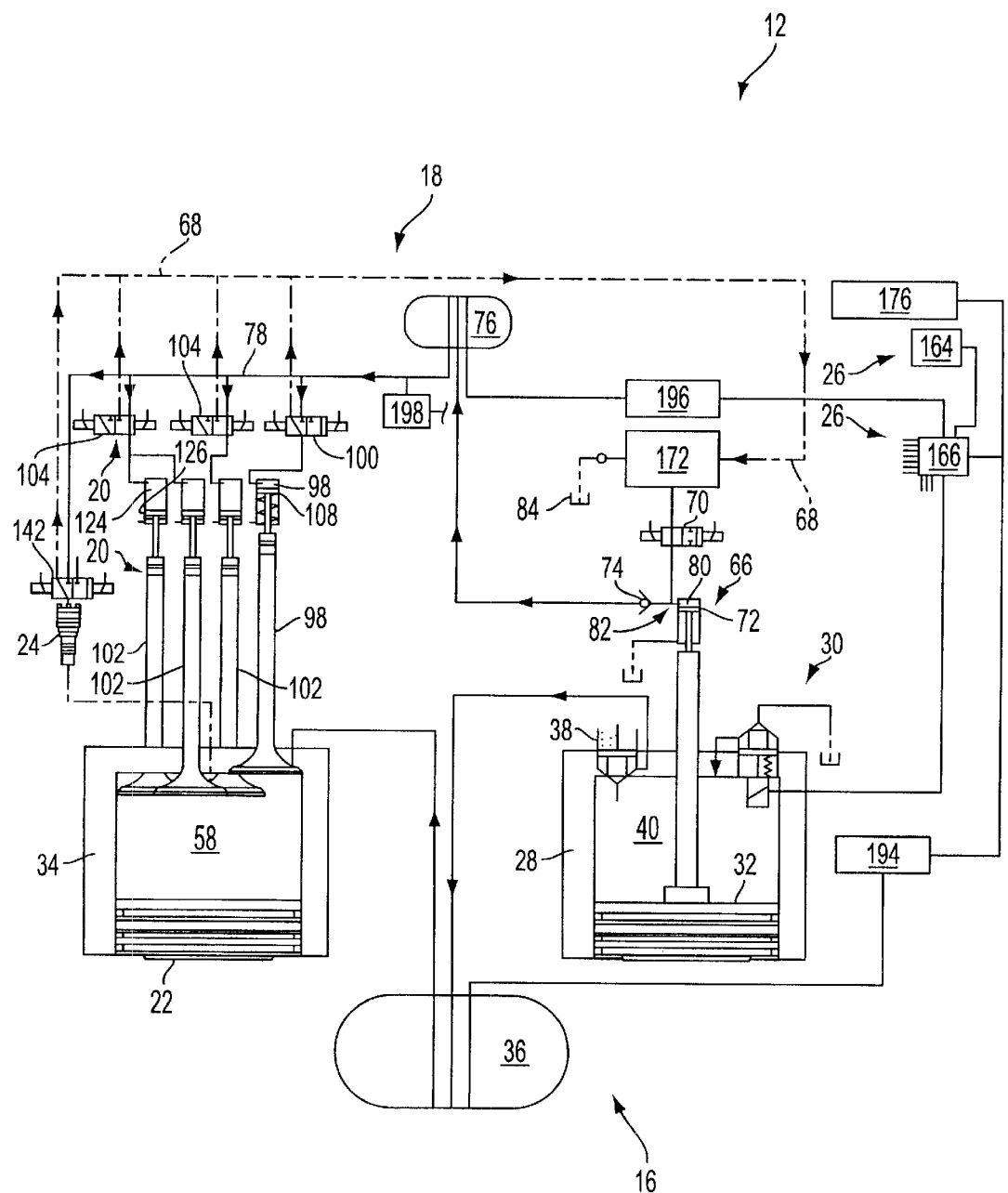
FIG. 6 is a general schematic view of a power module including a supercharger air system, an actuating fluid system, an air intake and exhaust valve system, and an electronic control system.

As shown in the embodiment of FIG. 6, each power module 12 includes a separate and independently operable supercharger air system 16, an actuating fluid system 18, an air intake and exhaust valve system 20, a power piston 22, at least one fluid injector 24, and an electronic control system 26.

Each supercharger air system 16 includes an air compressor cell 28, an electronically-controllable magnetically-latchable air supply valve 30, an air pump piston 32, a combustion cell 34, an air storage chamber or accumulator 36, and an air check valve 38.

Figure 3:
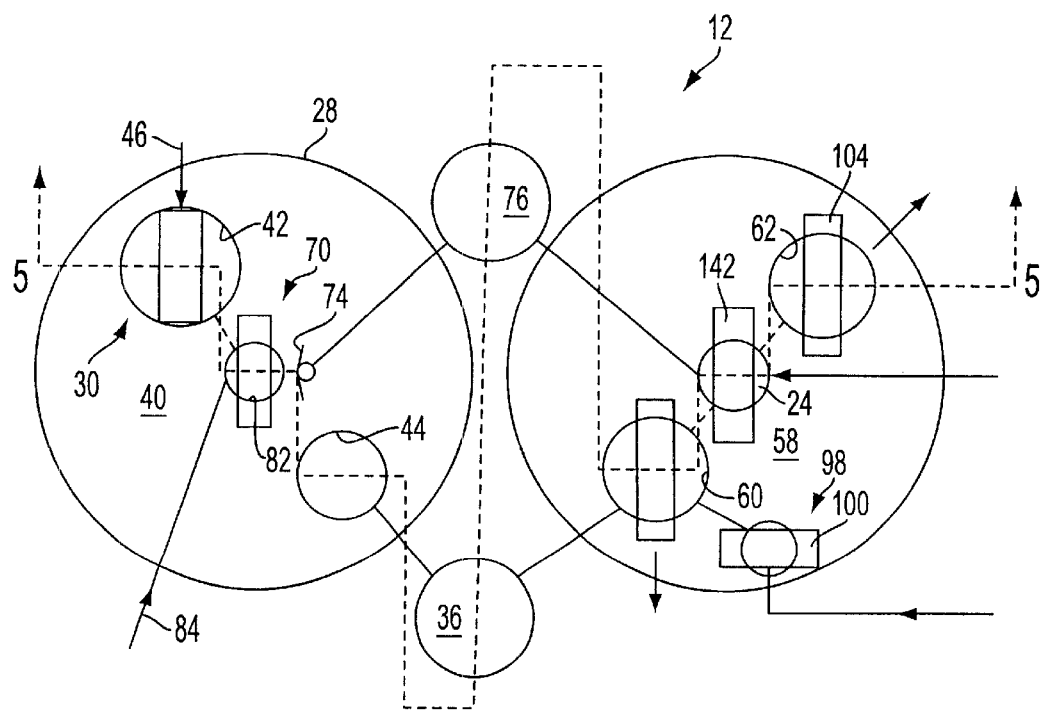
FIG. 3 is a top plan view of one embodiment of a power module of the present invention.
Figure 5:
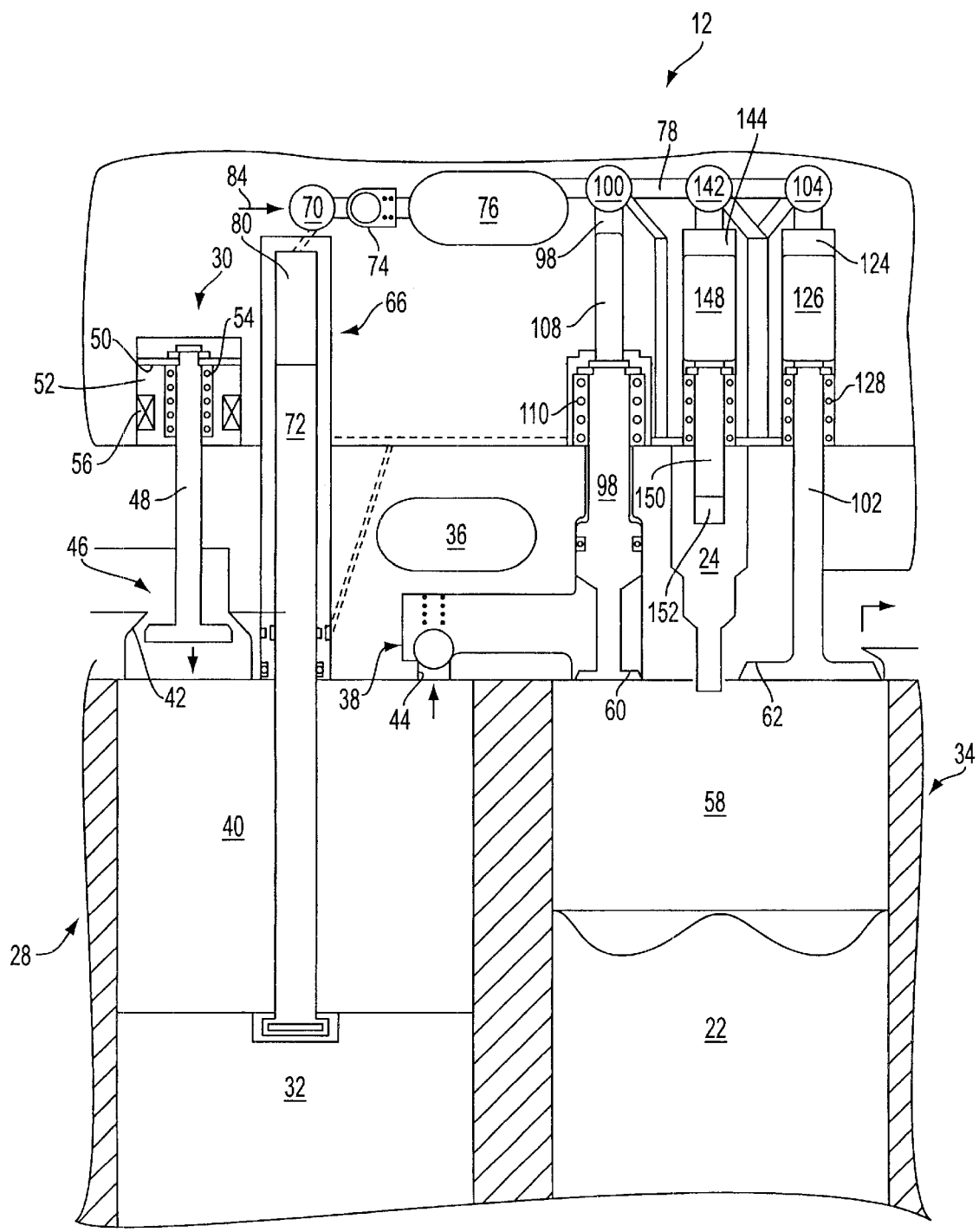
FIG. 5 is cross-sectional view of the power module taken generally along irregular line 5—5 of FIG. 3.

Each air compressor cell 28 defines a variable-volume air compressor chamber 40, at least one air supply port 42, and at least one air exit port 44. In the embodiment of FIGS. 3 and 5, each air supply port 42 is adapted to communicate with a source 46 of supply air such as the atmosphere. Alternatively, the air compressor cell may define multiple (e.g., three) air supply ports and a single air exit port, each arranged in separate fluid communication with the air compressor chamber.

Each air supply valve 30 is associated with its respective air supply port 42 and controls the flow of fluid (i.e., air) therethrough. Preferably, each air supply valve 30 is a poppet type valve. Each air supply valve 30 preferably includes a magnetically-latchable poppet 48 having an end portion 50 and movable between a closed position and an opened position. Each air supply valve 30 further includes a housing portion 52, a mechanical return spring 54, and an opening-direction electrical coil or electromagnet 56. The return spring 54 is operable to bias the poppet 48 towards its closed position at which the poppet 48 closes the air supply port 42 and thereby closes fluid communication between the source 46 of supply air and the air compressor chamber 40 via the air supply port 42. The opening-direction electrical coil 56 is located proximate the end portion 50 of the poppet 48 and is selectively operable to electromagnetically pull the poppet 48 towards its opened position at which the poppet 48 opens the air supply port 42 and thereby opens fluid communication between the source 46 of supply air and the air compressor chamber 40 via the air supply port 42.

The housing portion 52 and poppet 48 of the air supply valve 30 are each formed of a magnetizable material material such as 4140 hardened steel. The attractive residual magnetism of the housing portion 52 and the poppet 48 acts as a latching force that maintains the poppet 48 in its open position even after electrical power to the electrical coil 56 is terminated. Advantageously, electrical power can be conserved especially when no work is being done with respect to the poppet 48. The poppet 48 can thus be operated in a digital manner, wherein i) an electrical pulse may be provided to the opening-direction electrical coil 56 to move the poppet 48 to or towards its opened position against the bias of the compressed return spring 54 or ii) a reverse electrical pulse may be provided to the electrical coil 56 to minimize or eliminate the residual magnetism and thereby allow the compressed return spring 54 to move the poppet 48 to or towards its closed position.

Each air pump piston 32 is positioned in its respective air compressor chamber 40 and is operable to reciprocally move between i) an expansion position at which the air compressor chamber 40 reaches its maximum volume and ii) a contraction position at which the air compressor chamber 40 reaches its minimum volume. Each air pump piston 32 is coupled to the crankshaft 14, by for example a connecting rod (not shown), for synchronized movement therewith.

Each combustion cell 34 defines a variable-volume internal combustion chamber 58 separate from its respective air compressor chamber 40, at least one air intake port 60, and at least one exhaust port 62. Various combinations or numbers of air intake ports 60 and exhaust ports 62 are possible. Each air intake port 60 and exhaust port 62 is arranged in separate fluid communication with the combustion chamber 58. Each exhaust port may also be arranged in fluid communication between the combustion chamber 58 and a common exhaust manifold 63. In the embodiment shown in FIGS. 1–2, the air compressor cell 28 and the combustion cell 34 are integrally formed adjacent one another by a common engine block or housing 64. Alternatively, the air compressor cell 28 and the combustion cell 34 may be components that are directly connected together. In any event, the one or more power modules 12 advantageously form a relatively compact power unit when compared to a conventional four-stroke engine of similar maximum power output. In the embodiment shown in FIGS. 1–2, the air compressor cells 28 of the engine 10 are arranged in an alternating and substantially in-line pattern with respect to the combustion cells 34. Other relative orientations between the air compressor cells 28 and the combustion cells 34 are possible.

Each air storage chamber 36 is arranged in fluid communication between the respective air exit port 44 of the respective air compressor cell 28 and the respective air intake port 60 of the respective combustion cell 34. The air compressor chamber 40 and air storage chamber 36 of each power module 12 are isolated from fluid communication (and independently operable) with respect to the air compressor chamber 40 and air storage chamber 36 of any other power module 12 of the engine 10. Alternatively, the air storage chambers 36 may additionally provide pressurized air for other functions such as a pneumatic actuation, turbocharger boost, air horn, pneumatic inflation, etc.

Each air check valve 38 is arranged in fluid communication between its respective air exit port 44 and its respective air storage chamber 36. Each air check valve 38 is operable to allow only one-way fluid flow of air from its respective air compressor chamber 40 to its respective air storage chamber 36.

Referring to the embodiments of FIGS. 5–6, the actuating fluid system 18 includes an actuating fluid compressor cell 66, an actuating fluid drain passage 68, an electronically-controllable magnetically-latchable actuating fluid supply valve 70, an actuating fluid pump piston 72, an actuating fluid check valve 74, an actuating fluid storage chamber or accumulator 76, and an actuating fluid common rail 78.

Each actuating fluid compressor cell defines a variable-volume actuating fluid compressor chamber 80 and an actuating fluid port 82 arranged in fluid communication therewith. The actuating fluid port 82 is adapted to communicate with a source 84 of actuating fluid such as a tank containing hydraulic fluid, engine lubrication oil, or fuel.

Each actuating fluid drain passage 68 is adapted to be arranged in fluid communication with the source 84 of actuating fluid.

Figure 7:
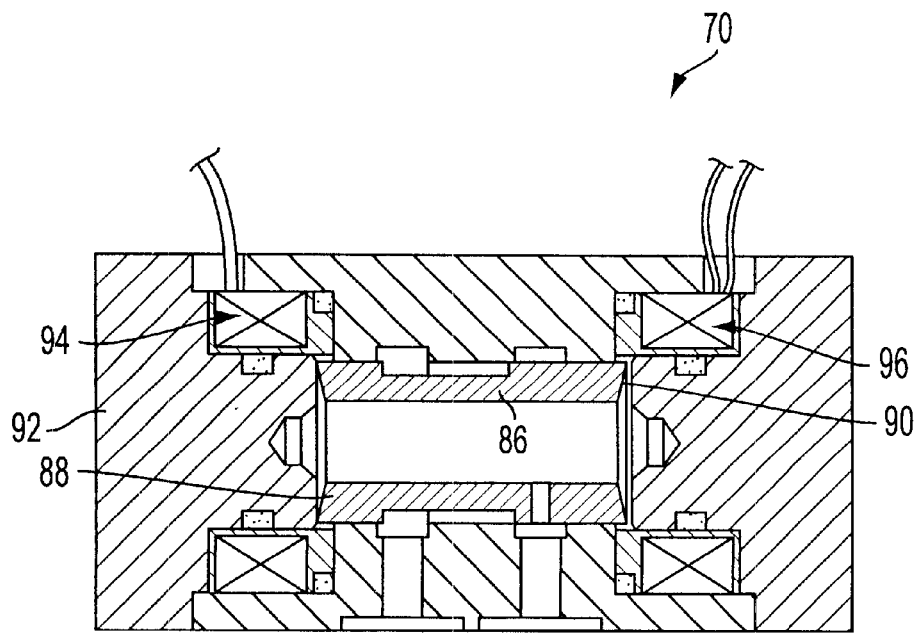
FIG. 7 is a cross-sectional view of an exemplary electronically-controllable magnetically-latchable two-way control valve of the power module shown in its closed position.
Figure 8:
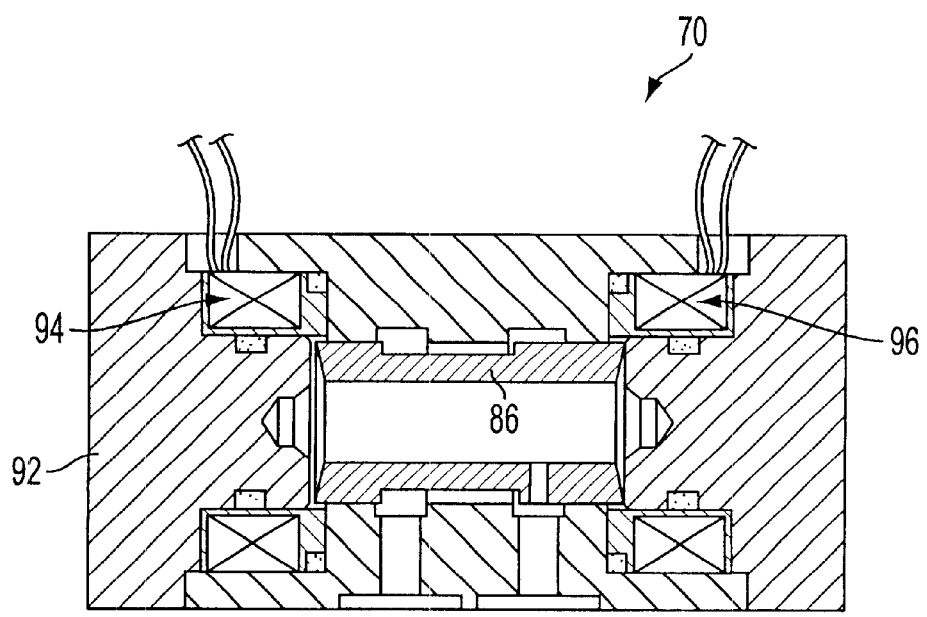
FIG. 8 is a view similar to FIG. 7 but showing the two-way control valve in its opened position.

Each actuating fluid supply valve 70 is arranged in fluid communication between the source 84 of actuating fluid and its respective actuating fluid port 82. In the embodiment shown, each actuating fluid supply valve 70 is a digitally-controlled two-way valve. Referring to FIGS. 7–8, each actuating fluid supply valve 70 includes a magnetically-latchable spool 86 having one end portion 88 and an opposite end portion 90 and movable between a closed position and an opened position, a housing portion 92, a closing-direction electrical coil or electromagnet 94 located proximate the one end portion 88 of the spool 86, and an opening-direction electrical coil or electromagnet 96 located proximate the opposite end portion 90 of the spool. The closing-direction electrical coil 94 is selectively operable to electromagnetically pull the spool 86 towards one state corresponding to the closed position of the actuating fluid supply valve 70. At its one state or closed position, the spool 86 closes fluid communication between the source 84 of actuating fluid and the actuating fluid compressor chamber 80 via the actuating fluid port 82. The opening-direction electrical coil 96 is selectively operable to electromagnetically pull the spool 86 towards another state corresponding to the opened position of actuating fluid supply valve 70. At its another state or opened position, the spool 86 opens fluid communication between the source 84 of actuating fluid and the actuating fluid compressor chamber 80 via the actuating fluid port 82.

The housing portion 92 and spool 86 are each formed of a magnetizable material material such as 4140 hardened steel. The attractive residual magnetism of the housing portion 92 and the spool 86 acts as a latching force that maintains the spool 86 in either its closed position or opened position even after electrical power to the respective electrical coil 94,96 is terminated. Advantageously, electrical power can be conserved especially when no work is being done with respect to the spool 86. The spool 86 can thus be operated in a digital manner , wherein i) an electrical pulse may be provided to the closing-direction electrical coil 94 to move the spool 86 to or towards its closed position or ii) an electrical pulse may be provided to the opening-direction electrical coil 96 to move the spool 86 to or towards its opened position.

The actuating fluid pump piston 72 is positioned in the actuating fluid compressor chamber 80. The actuating fluid pump piston 72 is operable to reciprocally move therein between i) an expansion position at which the actuating fluid compressor chamber 80 reaches its maximum volume and ii) a contraction position at which the actuating fluid compressor chamber 80 reaches its minimum volume. In the embodiment shown in FIG. 5, the actuating fluid pump piston 72 is coupled to the air pump piston 32 and is mechanically driven thereby.

The actuating fluid storage chamber 76 is arranged in fluid communication between the actuating fluid port 82 and the actuating fluid common rail 78. The actuating fluid compressor chamber 80, actuating fluid storage chamber 76, and actuating fluid common rail 78 of each power module 12 are isolated from fluid communication (and independently operable) with respect to the actuating fluid compressor chamber 80, actuating fluid storage chamber 76, and actuating fluid common rail 78 of any other power module 12 of the engine 10. The actuating fluid storage chamber 76 may either be connected to the actuating fluid compressor cell 66 or integrally formed therewith. Alternatively, the actuating fluid storage chambers 76 may additionally provide pressurized actuating fluid for other functions.

The actuating fluid check valve 74 is arranged in fluid communication between the actuating fluid port 82 of the actuating fluid compressor cell 66 and the actuating fluid storage chamber 76. The actuating fluid check valve 74 is operable to allow only one-way fluid flow of actuating fluid from the actuating fluid compressor chamber 80 to the actuating fluid storage chamber 76.

Each air intake and exhaust valve system 20 includes at least one hydraulically-actuatable intake valve 98, an electronically-controllable magnetically-latchable first control valve 100 associated with each intake valve 98, at least one hydraulically-actuatable exhaust valve 102, and an electronically-controllable magnetically-latchable second control valve 104 associated with each exhaust valve 102.

Each intake valve 98 is associated with a respective air intake port 60 of the respective combustion cell 34 to control the flow of fluid therethrough. Each intake valve 98 has an actuating fluid chamber 106 and a piston portion 108 positioned in the actuating fluid chamber 106. In the embodiments shown in FIGS. 5 and 6, each intake valve 98 is a poppet type valve. The intake valve 98 is selectively operable to reciprocally move between i) a closed position and ii) an opened position. At its closed position, the intake valve 98 closes the air intake port 60 and thereby closes fluid communication between the air storage chamber 36 and the combustion chamber 58 via the air intake port 60. At its opened position, the intake valve 98 opens the air intake port 60 and thereby opens fluid communication between the air storage chamber 36 and the combustion chamber 58 via the air intake port 60. The intake valve 98 further includes a mechanical return spring 110 operable to bias the intake valve 98 towards its closed position. As shown in FIG. 3, one or more of the intake valves 98 may optionally be arranged to control the flow of additional fluid, such as compressed natural gas or other alternative fuel, into the combustion chamber 58.

Figure 9:
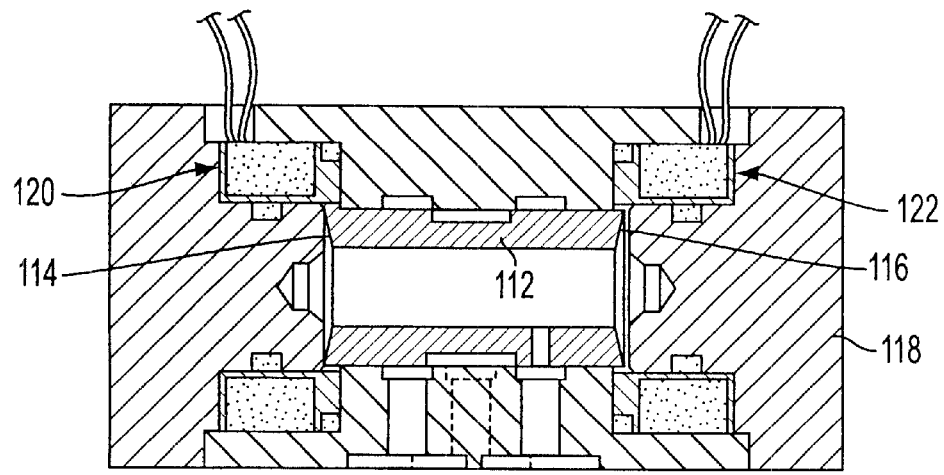
FIG. 9 is a cross-sectional view of an exemplary electronically-controllable magnetically-latchable three-way control valve of the power module shown in its closed position.
Figure 10:
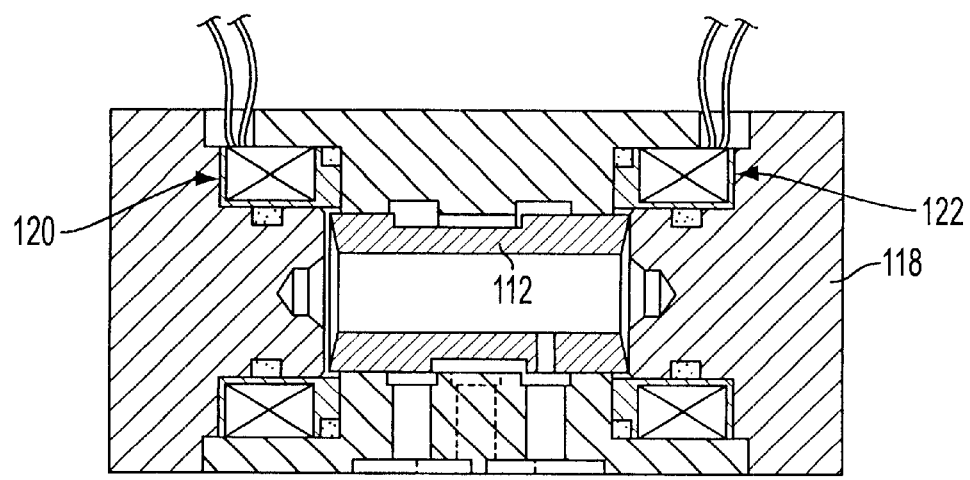
FIG. 10 is a view similar to FIG. 9 but showing the three-way control valve in its opened position.
Figure 11:
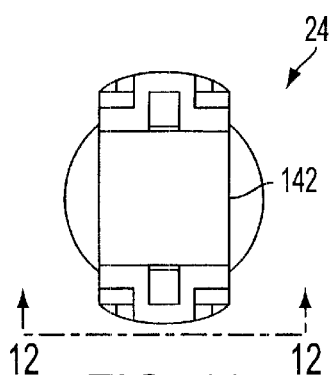
FIG. 11 is a top plan view of an exemplary fluid injector adapted for a power module of the present invention.
Figure 12:
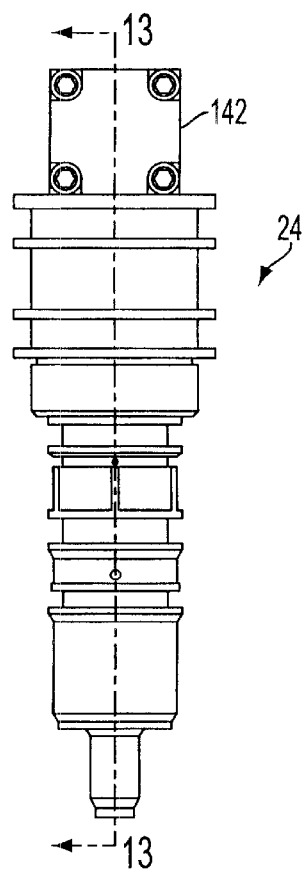
FIG. 12 is a side view of the fluid injector taken along line 12—12 of FIG. 11.

Each first control valve 100 is arranged in fluid communication between the actuating fluid common rail 78 and the respective actuating fluid chamber 106 of the respective intake valve 98. In the embodiments shown in FIGS. 5 and 6, each first control valve 100 is a digitally-controllable three-way valve. Referring to FIGS. 9–10, the first control valve 100 includes a magnetically-latchable spool 112 having one end portion 114 and an opposite end portion 116 and movable between a closed position and an opened position, a housing portion 118, a closing-direction electrical coil or electromagnet 120 located proximate the one end portion of the spool, and an opening-direction electrical coil or electromagnet 122 located proximate the opposite end portion 116 of the spool 112. The closing-direction electrical coil 120 is selectively operable to electromagnetically pull the spool 112 towards one state corresponding to the closed position of the first control valve 100. At its one state or closed position, the spool 112 closes fluid communication between the actuating fluid common rail 78 and the actuating fluid chamber 106 of the intake valve 98 and opens fluid communication between the actuating fluid drain passage 68 and the actuating fluid chamber 106 of the intake valve 98 thereby allowing the intake valve 98 to be moved towards its closed position. The opening-direction electrical coil 122 is selectively operable to electromagnetically pull the spool 112 towards its another state corresponding to the opened position of the first control valve 100. At its another state or opened position, the spool 112 opens fluid communication between the actuating fluid common rail 78 and the actuating fluid chamber 106 of the intake valve 98 and closes fluid communication between the actuating fluid drain passage 68 and the actuating fluid chamber 106 of the intake valve 98 thereby allowing the intake valve 98 to be hydraulically moved towards its opened position.

The housing portion 118 and spool 112 of the first control valve 100 are each formed of a magnetizable material material such as 4140 hardened steel. The attractive residual magnetism of the housing portion 118 and the spool 112 acts as a latching force that maintains the spool 112 in either its closed position or opened position even after electrical power to the respective electrical coil 120,122 is terminated. Advantageously, electrical power can be conserved especially when no work is being done with respect to the spool 112. The spool 112 can thus be operated in a digital manner, wherein i) an electrical pulse may be provided to the closing-direction electrical coil 120 to move the spool 112 to or towards its closed position or ii) an electrical pulse may be provided to the opening-direction electrical coil 122 to move the spool 112 to or towards its opened position.

Each hydraulically-actuatable exhaust valve 102 is associated with a respective exhaust port 62 of the respective combustion cell 34 to control the flow of fluid therethrough. In the embodiments shown in FIGS. 5 and 6, each exhaust valve 102 is a poppet type valve. The exhaust valve 102 has an actuating fluid chamber 124 and a piston portion 126 positioned in the actuating fluid chamber 124. The exhaust valve 102 is selectively operable to reciprocally move between i) a closed position at which the exhaust valve 102 closes its respective exhaust port 62 and thereby closes fluid communication between the combustion chamber 58 and the exhaust port 62 and ii) an opened position at which the exhaust valve 102 opens the exhaust port 62 and thereby opens fluid communication between the combustion chamber 58 and the exhaust port 62. The exhaust valve 102 further includes a mechanical return spring 128 operable to bias the exhaust valve 102 towards its closed position.

Each second control valve 104 is arranged in fluid communication between the actuating fluid common rail 78 and the actuating fluid chamber 124 of the exhaust valve 102. In the embodiments shown in FIGS. 5 and 6, each second control valve is a digitally-controllable three-way valve. Referring again to FIGS. 9–10, the second control valve 104 includes a magnetically-latchable spool 112 having one end portion 114 and an opposite end portion 116 and movable between a closed position and an opened position, a housing portion 118, a closing-direction electrical coil or electromagnet 120 located proximate the one end portion 114 of the spool 112, and an opening-direction electrical coil or electromagnet 122 located proximate the opposite end portion 116 of the spool 112. The closing-direction electrical coil 120 is selectively operable to electromagnetically pull the spool 112 towards one state corresponding to the closed position of the second control valve 104. At its one state or closed position, the spool 112 closes fluid communication between the actuating fluid common rail 78 and the actuating fluid chamber 124 of the exhaust valve 102 and opens fluid communication between the actuating fluid drain passage 68 and the actuating fluid chamber 124 of the exhaust valve 102 thereby allowing the exhaust valve 102 to be moved towards its closed position. The opening-direction electrical coil 122 is selectively operable to electromagnetically pull the spool 112 towards another state corresponding to the opened position of the second control valve 104. At its another state or opened position, the spool 112 opens fluid communication between the actuating fluid common rail 78 and the actuating fluid chamber 124 of the exhaust valve 102 and closes fluid communication between the actuating fluid drain passage 68 and the actuating fluid chamber 124 of the exhaust valve 102 thereby allowing the exhaust valve 102 to be hydraulically moved towards its opened position.

The housing portion 118 and spool 112 of the second control valve 104 are each formed of a magnetizable material material such as 4140 hardened steel. The attractive residual magnetism of the housing portion 118 and the spool 112 acts as a latching force that maintains the spool 112 in either its closed position or opened position even after electrical power to the respective electrical coil 120,122 is terminated. Advantageously, electrical power can be conserved especially when no work is being done with respect to the spool 112. The spool 122 can thus be operated in a digital manner, wherein i) an electrical pulse may be provided to the closing-direction electrical coil 120 to move the spool 112 to or towards its closed position or ii) an electrical pulse may be provided to the opening-direction electrical coil 122 to move the spool 112 to or towards its opened position.

Each power piston 22 is positioned in its respective combustion chamber 58 and is coupled to the crankshaft 14 (by, for example, a connecting rod that is not shown) for synchronized movement therewith. The power piston 22 is operable to move therein between i) an expansion position at which the combustion chamber 58 reaches its maximum volume and ii) a contraction position at which the combustion chamber 58 reaches its minimum volume.

Referring to FIGS. 10–13, each fluid injector 24 is preferably a hydraulically-actuatable electronically-control lable fluid-intensifiable injector selectively operable to inject fluid into the combustion chamber 58. The fluid injected by the injector 24 is preferably a fuel such as diesel fuel or gasoline. In the embodiment shown, the injector 24 includes an electronically-controllable magnetically-latchable third control valve 142, an actuating fluid chamber 144, a fluid pressure intensification device 146 including an intensifier piston 148 and a fuel plunger 150, a fuel pump chamber 152, an injection check valve 154, and a fluid spray tip 156.

Figure 13:
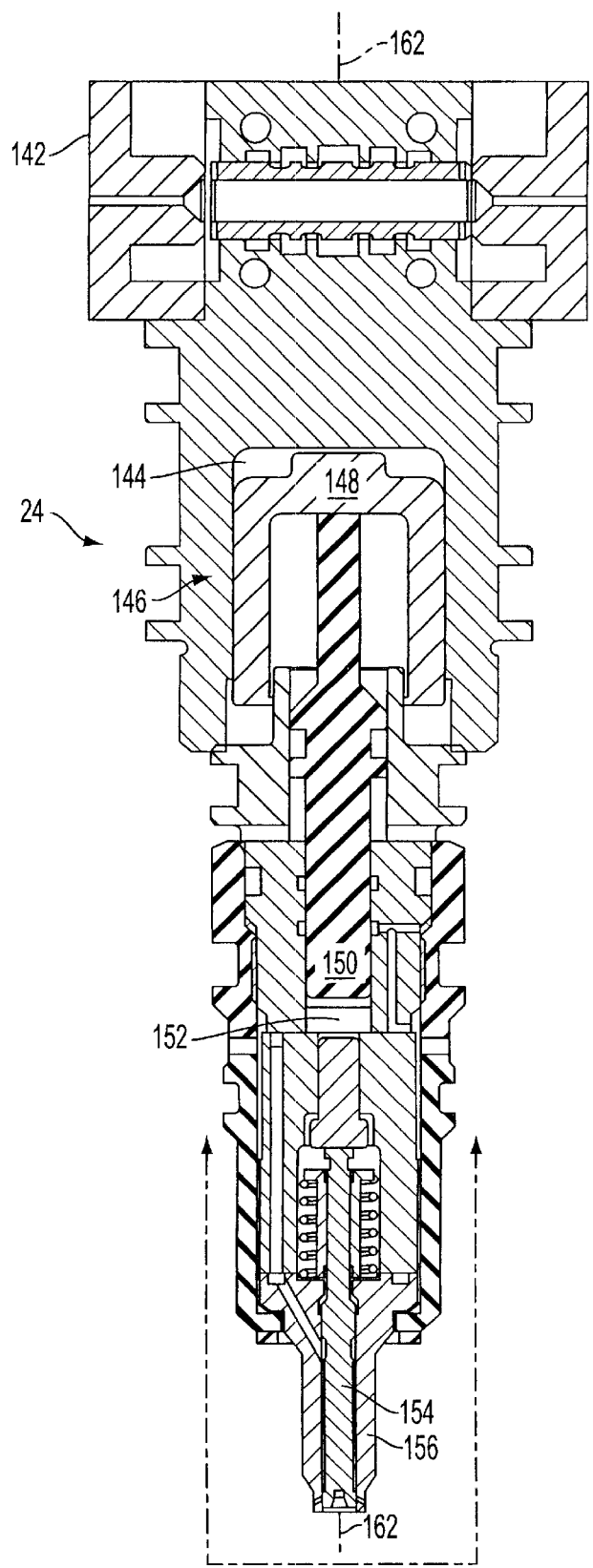
FIG. 13 is a cross-sectional view of the fluid injector taken along line 13—13 of FIG. 12.
Figure 14:
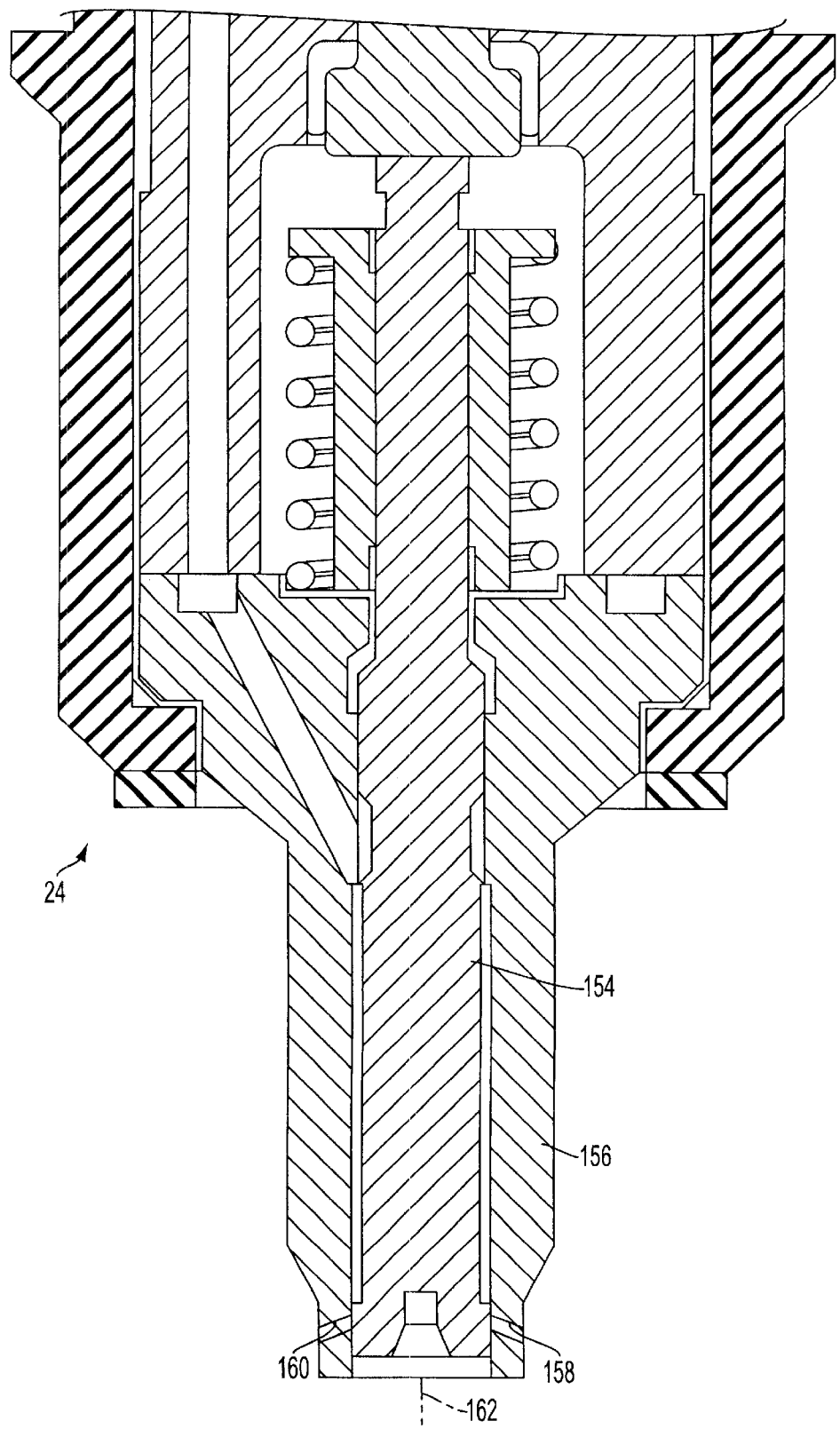
FIG. 14 is an enlarged partial view of the fluid injector taken along line 14—14 of FIG. 13.

As shown in the embodiments of FIGS. 5, 6, and 13, the third control valve 142 is preferably a three-way control valve, similar to the first and second control valves 100,104, but arranged in fluid communication between the actuating fluid common rail 78 and the actuating fluid chamber 144 of the injector 24. The third control valve 142 is selectively operable to move between i) a closed position and ii) an opened position. At its closed position, the third control valve 142 closes fluid communication between the actuating fluid common rail 78 and the actuating fluid chamber 144 of the injector 24 and opens fluid communication between the actuating fluid drain passage 68 and the actuating fluid chamber 144 of the injector 24 thereby allowing the check valve 154 to be moved towards its closed position and terminate fuel injection into the combustion chamber 58 via the spray tip 156. At its opened position, the third control valve 142 opens fluid communication between the actuating fluid common rail 78 and the actuating fluid chamber 144 of the injector 24 and closes fluid communication between the actuating fluid drain passage 68 and the actuating fluid chamber 144 of the injector 24 thereby allowing the check valve 154 to be hydraulically moved towards its opened position and initiate fuel injection into the combustion chamber 58 via the spray tip 156.

The check valve 154 of the fluid injector 24 is preferably a spool-type check valve movable between a closed position at which the check valve 154 blocks injection of fuel through the spray tip 156 and an opened position at which the check valve 154 opens injection of fuel through the spray tip 156. Alternatively, the check valve 154 may be a poppet-type check valve. Preferably, the spray tip 156 extends directly into the respective combustion chamber 58 and defines a plurality of fluid spray orifices 158,160 staggered along the longitudinal axis 162 of the spray tip 156. Preferably, the pilot spray orifices 158 (located nearest to the closed check valve) are formed relatively more restricted for optimum pilot injection and the main spray orifices 160 (located furthest from the closed check valve) are formed relatively less restricted for main fluid injection. Advantageously, the one or more pilot spray orifices 158 open sequentially before the one or more main spray orifices 160 when the check valve 154 is moved from its closed position to its opened position. Thus, the fluid injector 24 is capable of providing multiple stages of fluid injection in order to ensure optimum atomization of fuel and mixing with air under all engine operating conditions (e.g., idle as well as full engine load conditions). Consequently, the fuel and air in the combustion chamber 58 are burned more efficiently and completely thereby producing lower emissions and lower fuel consumption for a given power output.

Figure 15:
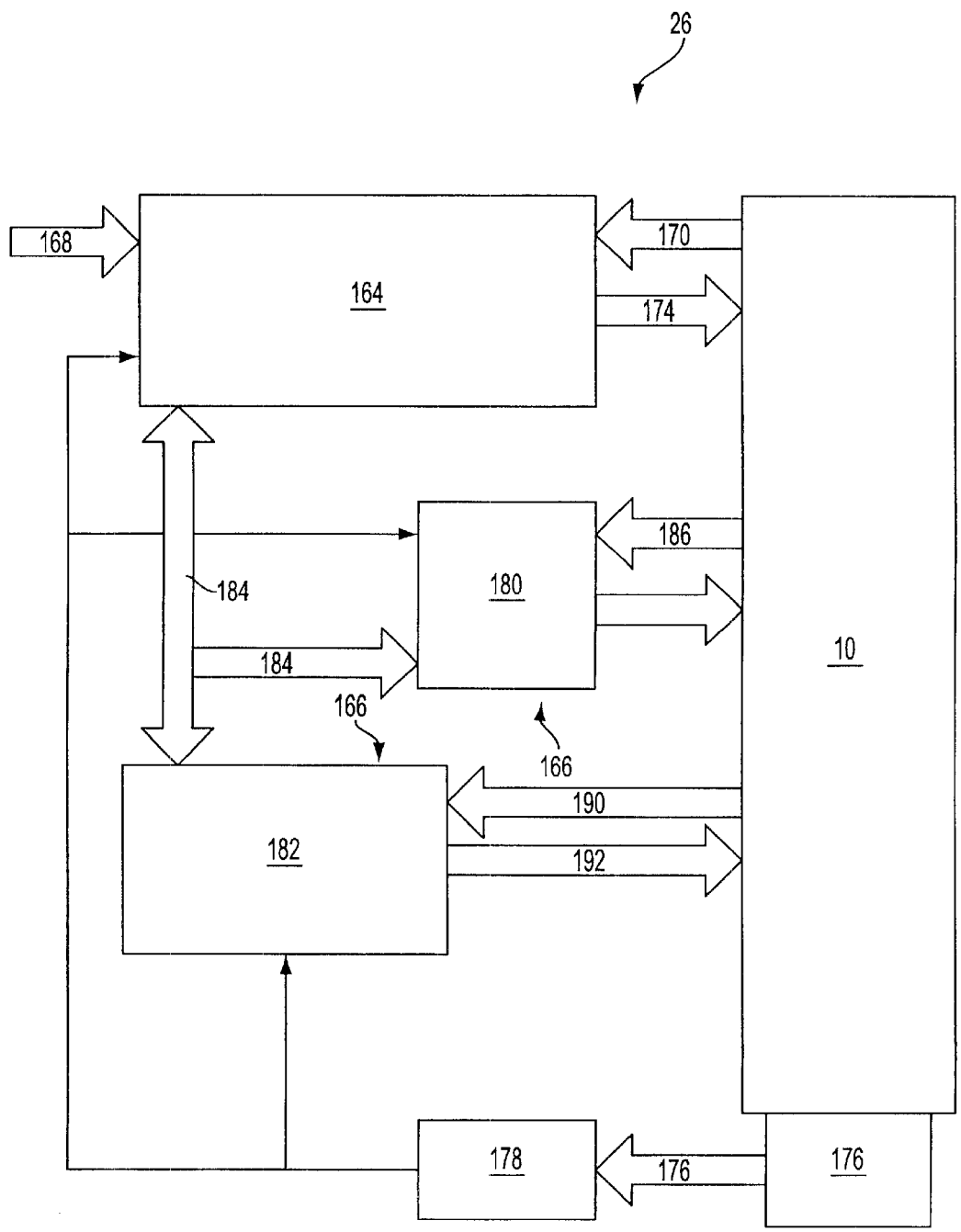
FIG. 15 is a more detailed schematic view of an exemplary electronic control system for the power module of FIG. 6.

Referring to FIGS. 6 and 15, the electronic control system 26 includes at least one electronic control unit 164, at least one drive module 166, and one or more sensors. In one embodiment of the present invention, a single electronic control unit 164 is provided for the entire engine 10. Alternatively, a separate electronic control unit 164 may be provided for each power module 12 of the engine 10. The electronic control unit 164 is operable to selectively and independently control the operation (including timing and duration) of each electronically-controllable valve 30,70, 100,104,142 of each power module 12 with one or more digital pulses of electrical current generated by the respective drive module 166. Control input signals (such as starter operation inputs, ignition switch position, and engine brake) communicated to the electronic control unit 164 are generally indicated by reference number 168. Input sensor signals (indicating for example, actuating fluid temperature, actuating fluid pressure, manifold air pressure, exhaust back pressure, etc.) communicated to the electronic control unit 164 are generally indicated by reference number 170. Output signals communicated by the electronic control unit 164 to actuators associated with, for example, a relatively low pressure actuating fluid supply pump 172 (FIG. 6) or engine starter (not shown) are generally indicated by reference number 174. Reference number 176 indicates crankshaft or power piston position input signals that are communicated to the electronic control unit 164 and each drive module 166 from a crankshaft or power piston position sensor 177 and master timing unit 178.

Each drive module 166 may either be formed as a separate device or integrally formed with the electronic control unit 164. Each drive module 166 preferably includes an injector drive module 180 and an engine valve drive module 182. Alternatively, the injector drive module 180 and engine valve drive module 182 may be formed as a single device. In the embodiment shown in FIG. 15, a control area network (CAN) 184 is connected between the electronic control unit 164 and each drive module 180,182 for electronically sharing information, such as engine speed and actuating fluid temperature, and for electronically communicating commands or instructions.

Reference number 186 generally refers to input signals, indicating one or more parameters of injector operation (e.g., position), communicated to the injector drive module 180 for closed-loop control. Reference number 188 generally refers to output signals communicated by the injector drive module to one or more third control valves 142 of the injectors 24.

Reference number 190 generally refers to input signals, indicating one or more parameters of engine valve operation (e.g., position), communicated to the engine valve drive module 182 for closed-loop control. Reference number 192 generally refers to output signals communicated by the engine valve drive module 182 to one or more of the first and second control valves 100,104.

Referring to FIG. 6, the one or more sensors preferably includes at least one air pressure sensor 194, and at least one actuating fluid pressure sensor 196. The air pressure sensor 194 is operable to sense the pressure of air in the respective air storage chamber 36 and provide the respective electronic control unit 164 with a signal indicative of such pressure. The electronic control unit 164 and respective engine valve drive module 182 is operable to move the air supply valve 30 i) to its opened position in response to the pressure being below a threshold air pressure and ii) to its closed position in response to the pressure being at least the threshold air pressure.

The actuating fluid pressure sensor 196 is operable to i) sense the pressure of actuating fluid in the actuating fluid storage chamber 76 and ii) provide the electronic control unit 164 with an actuating fluid pressure signal indicative of said pressure. The electronic control unit 164 is operable to independently control the operation of the actuating fluid supply valve 70 in response to the magnitude of the actuating fluid pressure signal.

The electronic control system 26 may further include another actuating fluid pressure sensor 198 for each actuating fluid common rail 78. The another actuating fluid pressure sensor 198 is operable to i) sense the pressure of actuating fluid in the actuating fluid common rail 78 and ii) provide the electronic control unit 164 with another actuating fluid pressure signal indicative of that pressure. The electronic control unit 164 is operable to independently control the operation of the first and second control valves 100,104 in response to the magnitude of this another actuating fluid pressure signal.

The crankshaft 14 is selectively rotatable in one angular direction and a reverse angular direction in response to selectable timing and sequence of operation of the air intake valve(s) 98, exhaust valve(s) 102, and the injector 24 relative to the position of the power piston 22. This advantageously eliminates the need for a reverse gear in a transmission (not shown) connected to the engine 10.

Figure 4:
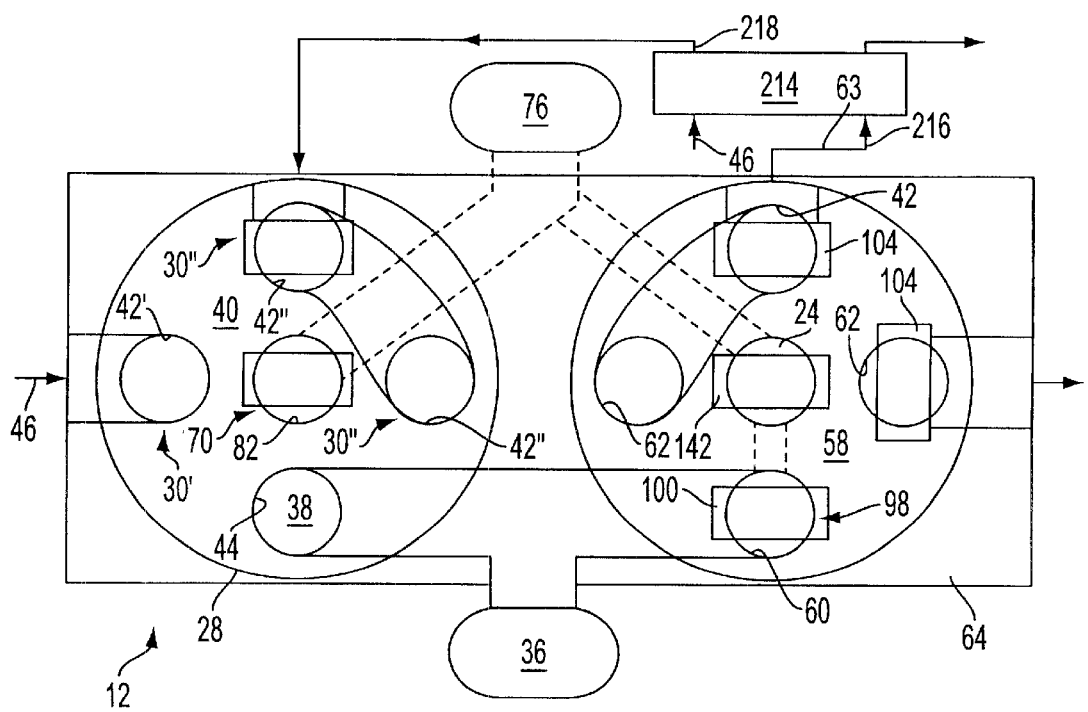
FIG. 4 is a view similar to FIG. 3 but showing an alternative embodiment of a power module of the present invention.

An alternative embodiment of the power module 12 is shown in FIG. 4. The power module 12' may be similar to the power module previously described except that it has a modified supercharger air system, a turbocharger 214 having an exhaust gas inlet 216 and a compressed air outlet 218, and a modified air intake and exhaust valve system. The modified supercharger air system 16' includes an air compressor cell 28', a free air supply valve 30', a turbocharged air supply valve 30", an air pump piston 32, a combustion cell 58', and an air storage chamber 76.

The air compressor cell 28' defines a variable-volume air compressor chamber 40, at least one free air supply port 42' adapted to communicate with atmosphere, at least one turbocharged air supply port 42" arranged in fluid communication with the compressed air outlet 218 of the turbocharger 214, and an air exit port 44. The free air supply port 42', turbocharged air supply port 42", and air exit port 44 are each arranged in separate fluid communication with the air compressor chamber 40.

The free air supply valve 30' is associated with the free air supply port 42' to control the flow of fluid therethrough. The free air supply valve 30' is selectively operable to move between i) a closed position and ii) an opened position. At its closed position, the free air supply valve 30' closes the free air supply port 42' and thereby closes fluid communication between atmosphere and the air compressor chamber 40 via the free air supply port 42'. At its opened position, the free air supply valve 30' opens the free air supply port 42' and thereby opens fluid communication between atmosphere and the air compressor chamber 40 via the free air supply port 42'.

The turbocharged air supply valve 30" is associated with each turbocharged air supply port 42" and is selectively operable to move between i) a closed position and ii) an opened position. At its closed position, the turbocharged air supply valve 30" closes its respective turbocharged air supply port 42" and thereby closes fluid communication between the compressed air outlet 218 of the turbocharger 214 and the air compressor chamber 40 via the respective turbocharged air supply port 42". At its opened position, the turbocharged air supply valve 30" opens its respective turbocharged air supply port 42" and thereby opens fluid communication between the compressed air outlet 218 of the turbocharger 214 and the air compressor chamber 40 via the respective turbocharged air supply port 42".

The combustion cell 34 defines a variable-volume combustion chamber 58' separate from the air compressor chamber 40, an air intake port 60, a free exhaust port 62' adapted to communicate with atmosphere, and at least one drive exhaust port 62" arranged in fluid communication with the exhaust gas inlet 216 of the turbocharger 214. The air intake port 60, free exhaust port 62', and drive exhaust port 62" are each arranged in separate fluid communication with the combustion chamber 58'.

The modified air intake and exhaust valve system includes at least one intake valve 98, at least one free exhaust valve 102', and at least one drive exhaust valve 102". The free exhaust valve 102' is associated with the free exhaust port 62' of the combustion cell 34 and is selectively operable to move between i) a closed position and an opened position. At its closed position, the free exhaust valve 102' closes the free exhaust port 62' and thereby closes fluid communication between the combustion chamber 58' and atmosphere via the free exhaust port. At its opened position, the free exhaust valve 102' opens the free exhaust port 62' and thereby opens fluid communication between the combustion chamber 58' and atmosphere via the free exhaust port 62'.

The drive exhaust valve 102" is associated with each drive exhaust port 62" of the combustion cell 34 and is selectively operable to move between i) a closed position and ii) an opened position. At its closed position, the drive exhaust valve 102" closes its respective drive exhaust port 62" and thereby closes fluid communication between the combustion chamber 58' and the exhaust gas inlet 216 of the turbocharger 214 via the respective drive exhaust port 62". At its opened position, the drive exhaust valve 102" opens its respective drive exhaust port 62" and thereby opens fluid communication between the combustion chamber 58' and the exhaust gas inlet 216 of the turbocharger 214 via the respective drive exhaust port 62".

INDUSTRIAL APPLICABILITY

One embodiment of the subject invention is capable of operating as a dynamically-variable (e.g., 2, 4, 6, 8, etc.) stroke per cycle internal combustion engine 10. One embodiment of the subject power module 12 or engine 10 when switched to a two-stroke engine cycle is particularly advantageous for instantly developing more power (i.e., more work per unit time or stroke) in a relatively smaller package (e.g., fewer combustion cylinders and related components) compared to conventional four-stroke internal combustion engines. This design advantageously incorporates one or more poppet-type air intake valves 98 and one or more poppet-type exhaust valves 102 for possible two-cycle operation yet avoids possible collision between the power piston 22 and such poppet valves. This is because such poppet-type valves can be actuated when the power piston is far enough away from its top dead center position. The selectable engine cycles having a greater number of strokes per engine cycle are particularly advantageous for facilitating longer duration of containment of exhaust gas within the combustion chamber 58 to facilitate more complete burning of combustion gases or byproducts An exemplary method of two-stroke diesel-cycle operation will now be described although it should be understood that the subject power module 12 and engine 10 are capable of many other types of operation.

Figure 16:
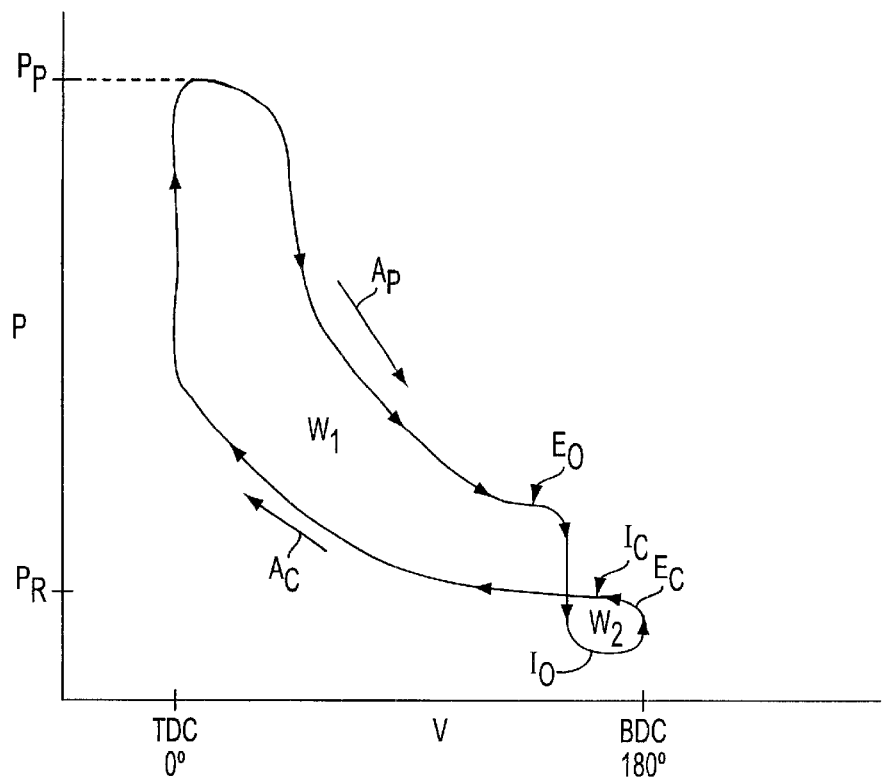
FIG. 16 is a schematic representation of an exemplary operating cycle, in terms of pressure P as a function of volume V in the combustion chamber, for a power module selectively operating in a two-stroke mode.
Figure 17:
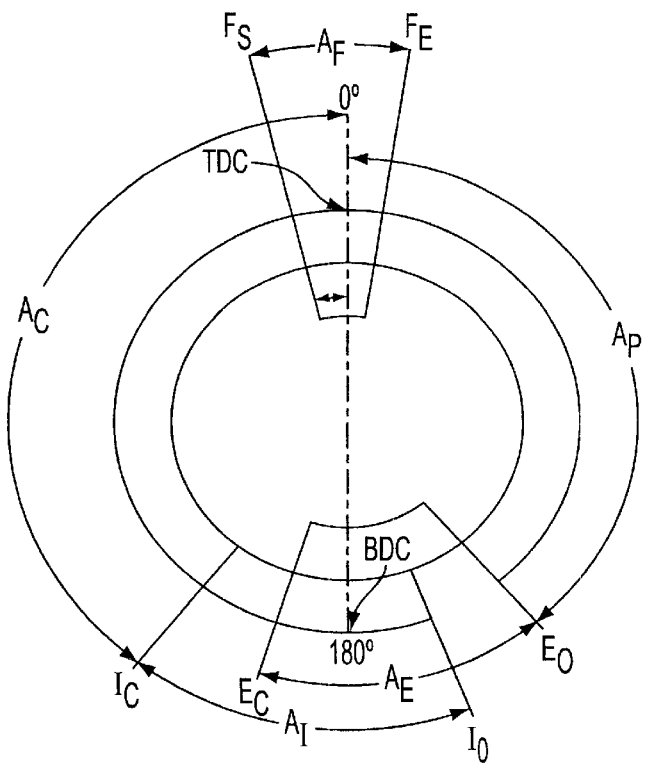
FIG. 17 is an alternative schematic representation of an exemplary operating cycle, in terms of crankshaft angular position or power piston position, for a power module selectively operating in a two-stroke mode.

Referring to FIGS. 15–16, the start of fuel injection (corresponding to power piston position $F_S$) and the end of fuel injection (corresponding to power piston position $F_E$) into the combustion chamber 58 typically occurs over a crankshaft angular displacement $A_F$ when the intake valve (s) 98 and exhaust valve(s) 102 are both closed. For example, the start of injection $F_S$ may occur about 15° before the top dead center position (TDC) of the power piston 22 and continue for a total crankshaft angular displacement $A_F$ of about 23°. The exhaust valve 102 is opened at power piston position $E_O$ after the power piston 22 has been moved over a work or power producing crankshaft angular displacement $A_P$ which may, for example, equal about 140° after TDC of the power piston 22. During this period, exhaust gas within the combustion chamber escapes through the opened exhaust port. After the fluid pressure within the combustion chamber 58 has minimized to a selected level, the intake valve 98 is subsequently opened at power piston position $I_O$ which may, for example, correspond to about 160° after TDC. While the intake valve 98 remains open, pressurized air from the air storage chamber 36 is communicated to the combustion chamber 58 and further assists the expulsion of exhaust gas. The power piston 22 is then moved to its expansion position BDC and then towards its contraction position TDC. The exhaust valve 102 is then closed at power piston position $E_C$ which may, for example, correspond to about 20° after BDC of the power piston 22 or about 200° after TDC of the power piston 22. During this period, the intake valve 98 remains open a selected amount of time facilitate pressurization of the combustion chamber 58 to a selected residual pressure PR. The intake valve 98 is then closed at power piston position $I_C$ which may, for example, correspond to about 40° after BDC of the power piston 22 or about 220° after TDC of the power piston 22. The power piston 22 is then moved along its compression phase $A_C$ towards its contraction position (TDC). The timing and duration of actuation of each of the intake valve(s) and exhaust valve(s) may be independently chosen and varied as desired. Moreover, in the case of multiple intake valves and/or multiple exhaust valves, actuation of each group may be staged over time.

In this example, the total crankshaft angular displacement during the time the exhaust valve 102 opens ($E_o$), the intake valve 98 opens ($I_o$), the exhaust valve 102 closes ($E_C$), and the intake valve 98 closes (Ic) is about 80°. In contrast, conventional two-stroke engines typically have a total crankshaft angular displacement of about 150° between the time the exhaust valve opens, the intake valve opens, the intake valve closes, and the exhaust valve closes. This relatively shorter duration of total valve actuation associated with one embodiment of the subject invention advantageously increases the available work or power producing crankshaft angular displacement $A_P$.

During operation, the power module 12 is capable of maintaining at least a residual or minimum fluid pressure $P_R$, in the combustion chamber 58 that is greater than atmospheric pressure, substantially throughout the engine cycle of operation For example, in the embodiment illustrated, the residual fluid pressure $P_R$ in the combustion chamber 58 may be at least about 138 kPa (about 20 psi) and may lie in the range of about 138 to 207 kPa (about 20 to 30 psi). Conventional two-stroke engines are merely able to maintain a residual fluid pressure of about 0 to 34.5 kPa (0 to 5 psi). The relatively higher residual fluid pressures $P_R$ of the present invention enable relatively higher peak fluid pressures $P_P$ (for example, at least about 13,790 kPa /2000 psi) to be produced in the combustion chamber 58 during the engine cycle.

In FIG. 16, the two areas $W_1$, $W_2$ enclosed by the pressure P versus volume V curve indicate the net amount of work done by the power piston 22 during one cycle of operation. The relatively high peak fluid pressure $P_P$ therefore contributes to a relatively higher work or power output of the power module 12 or engine 10. Generally, such peak fluid pressures $P_P$ of one embodiment of the subject invention may be limited by the strength of material(s) for the combustion cell 34.

Another advantage of one embodiment the power module 12 is that it has an air compressor chamber 40 for locally compressing air and a separate combustion chamber 58 for the generation of power. By dividing these functions into separate chambers, each chamber advantageously has a larger available surface area available for handling (i.e., admitting and transferring) required fluids.

One embodiment of the subject power module also substitutes digitally-controllable valve actuators 30, 70, 100, 104,142 for conventional camshafts or solenoid-type actuators. Such digitally-controllable actuators provide greater flexibility (i.e., greater independence) and relatively fast flow control of air, fuel, and exhaust gas relative to the combustion chamber 58 during an engine cycle. Such actuators can be dynamically controlled to even selectively reverse the rotating direction of the engine crankshaft 14. This capability advantageously eliminates the need for a reverse gear in a transmission coupled to one embodiment of the subject power module or engine. Such actuators also conserve electrical energy and may also provide engine compression braking and energy recovery when deceleration is desired and/or vary the number of strokes per engine cycle. One embodiment of the subject power module features a modular cylinder head design for greater serviceability and also facilitating a choice in the number of power modules 12 coupled to form an engine 10.

The electronic control system 26 may be formed of individual electronic control units 162 associated with each power module 12 that provides greater flexibility (i.e., greater independence) in the control of air, fuel and exhaust gas relative to each power module 12. The combustion chamber 58 of each power module 12 is supercharged by its own built-in air compressor and air storage chamber thus providing instant full power in a simple and reliable package. The above modular features also provide greater safety in terms of relatively low external fluid pressures and relatively low electrical voltages. The independently operating power modules 12 collectively enable limp-home capability in the event of a localized failure. The fluid injector 24 is capable of effectively controlling the injection of fuel for optimum atomization and mixing with air under a wide range of operating conditions. Each power module 12 has its own source of pressurized actuating fluid by means of a separate built-in actuating fluid pump. This eliminates the need for conventional high pressure actuating fluid common rails that may disable an entire engine in the event of failure. The ability of the power module 12 to dynamically vary the number of strokes per engine cycle may enable the power module 12 to exhibit lower noxious emissions than conventional engines.

Other aspects, objects, and advantages of this invention can be obtained from a study of the drawings, the disclosure, and the appended claims.

I claim:

1. A power module, comprising:

an air compressor cell defining a variable-volume air compressor chamber, an air supply port, and an air exit port, said air supply port and air exit port each arranged in fluid communication with the air compressor chamber, said air supply port adapted to communicate with a source of supply air;

an electronically-controllable magnetically-latchable air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port;

an air pump piston positioned in the air compressor chamber and operable to move between i) an expansion position at which the air compressor chamber reaches its maximum volume and ii) a contraction position at which the air compressor chamber reaches its minimum volume;

a combustion cell defining a variable-volume combustion chamber separate from the air compressor chamber, an air intake port, and an exhaust port, said air intake port and exhaust port each arranged in fluid communication with the combustion chamber;

an air storage chamber arranged in fluid communication between the air exit port of the air compressor cell and the air intake port of the combustion cell;

an intake valve associated with the air intake port of the combustion cell and selectively operable to move between I) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;

an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the combustion chamber and operable to move therein between i) an expansion position at which the combustion chamber reaches its maximum volume and ii) a contraction position at which the combustion chamber reaches its minimum volume.

2. The power module of claim 1, wherein the air compressor cell and the combustion cell are integrally formed adjacent one another by a common housing.

3. The power module of claim 1, further including a direct-injection fuel injector extending into the combustion chamber and selectively operable to inject fuel therein.

4. A power module, comprising:

an air compressor cell defining a variable-volume air compressor chamber, an air supply port, and an air exit port, said air supply port and air exit port each arranged in fluid communication with the air compressor chamber, said air supply port adapted to communicate with a source of supply air;

an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port;

an air pump piston positioned in the air compressor chamber and operable to move between i) an expansion position at which the air compressor chamber reaches its maximum volume and ii) a contraction position at which the air compressor chamber reaches its minimum volume;

a combustion cell defining a variable-volume combustion chamber separate from the air compressor chamber, an air intake port, and an exhaust port, said air intake port and exhaust port each arranged in fluid communication with the combustion chamber;

an air storage chamber arranged in fluid communication between the air exit port of the air compressor cell and the air intake port of the combustion cell;

an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;

an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the combustion chamber and operable to move therein between i) an expansion position at which the combustion chamber reaches its maximum volume and ii) a contraction position at which the combustion chamber reaches its minimum volume, further including an air check valve arranged in fluid communication between said air exit port of the air compressor cell and the air storage chamber, said air check valve operable to allow only one-way fluid flow from the air compressor chamber to the air storage chamber.

5. A power module, comprising:

an air compressor cell defining a variable-volume air compressor chamber, an air supply port, and an air exit port, said air supply port and air exit port each arranged in fluid communication with the air compressor chamber, said air supply port adapted to communicate with a source of supply air;

an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port;

an air pump piston positioned in the air compressor chamber and operable to move between i) an expansion position at which the air compressor chamber reaches its maximum volume and ii) a contraction position at which the air compressor chamber reaches its minimum volume;

a combustion cell defining a variable-volume combustion chamber separate from the air compressor chamber, an air intake port, and an exhaust port, said air intake port and exhaust port each arranged in fluid communication with the combustion chamber;

an air storage chamber arranged in fluid communication between the air exit port of the air compressor cell and the air intake port of the combustion cell;

an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;

an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the combustion chamber and operable to move therein between i) an expansion position at which the combustion chamber reaches its maximum volume and ii) a contraction position at which the combustion chamber reaches its minimum volume, wherein said air supply valve is an electronically-controllable two-way valve including a movable magnetically-latchable poppet having an end portion, a return spring operable to bias the poppet towards one position corresponding to the closed position of the air supply valve, and an opening-direction electrical coil located proximate the end portion of the poppet, said opening-direction electrical coil selectively operable to electromagnetically pull the poppet towards another position corresponding to the opened position of the air supply valve.

6. The power module of claim 5, further including an electronic control unit operable to selectively and independently control the operation of the air supply valve with digital pulses of electrical current.

7. The power module of claim 6, further including an air pressure sensor operable to sense the pressure of air in the air storage chamber and provide the electronic control unit with a signal indicative of such pressure, said electronic control unit operable to move the air supply valve to its opened position in response to said pressure being below a threshold air pressure, said electronic control unit operable to move the air supply valve to its closed position in response to said pressure being at least the threshold air pressure.

8. The power module of claim 7, wherein the electronic control unit is operable to selectively and independently control the operation of the air supply valve in further response to at least one sensed parameter selected from the group of ambient air temperature, ambient barometric pressure, inlet air temperature, inlet air pressure, actuating fluid temperature, actuating fluid pressure, throttle position, power piston position, engine brake signals, starter inputs, and ignition switch position.

9. A power module, comprising:
an air compressor cell defining a variable-volume air compressor chamber, an air supply port, and an air exit port, said air supply port and air exit port each arranged in fluid communication with the air compressor chamber, said air supply port adapted to communicate with a source of supply air;
an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port;
an air pump piston positioned in the air compressor chamber and operable to move between i) an expansion position at which the air compressor chamber reaches its maximum volume and ii) a contraction position at which the air compressor chamber reaches its minimum volume;
a combustion cell defining a variable-volume combustion chamber separate from the air compressor chamber, an air intake port, and an exhaust port, said air intake port and exhaust port each arranged in fluid communication with the combustion chamber;
an air storage chamber arranged in fluid communication between the air exit port of the air compressor cell and the air intake port of the combustion cell;
an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;
an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and
a power piston positioned in the combustion chamber and operable to move therein between i) an expansion position at which the combustion chamber reaches its maximum volume and ii) a contraction position at which the combustion chamber reaches its minimum volume, wherein the air pump piston and the power piston are movable by a common drive device.

10. The power module of claim 9, wherein said common drive device includes a rotatable crankshaft.

11. A power module, comprising:
a turbocharger including an exhaust gas inlet and a compressed air outlet;
an air compressor cell defining a variable-volume air compressor chamber, a free air supply port adapted to communicate with atmosphere, at least one turbocharged air supply port arranged in fluid communication with the compressed air outlet of the turbocharger, and an air exit port, said free air supply port, turbocharged air supply port, and air exit port each arranged in separate fluid communication with the air compressor chamber;
an electronically-controllable magnetically-latchable free air supply valve associated with the free air supply port and selectively operable to move between i) a closed position at which the free air supply valve closes the free air supply port and thereby closes fluid communication between atmosphere and the air compressor chamber via the free air supply port and ii) an opened position at which the free air supply valve opens the free air supply port and thereby opens fluid communication between atmosphere and the air compressor chamber via the free air supply port;
an electronically-controllable magnetically-latchable turbocharged air supply valve associated with each turbocharged air supply port and selectively operable to move between i) a closed position at which the turbocharged air supply valve closes its respective turbocharged air supply port and thereby closes fluid communication between the compressed air outlet of the turbocharger and the air compressor chamber via the respective turbocharged air supply port and ii) an opened position at which the turbocharged air supply valve opens its respective turbocharged air supply port and thereby opens fluid communication between the compressed air outlet of the turbocharger and the air compressor chamber via the respective turbocharged air supply port;
an air pump piston positioned in the air compressor chamber and operable to move between i) an expansion position at which the air compressor chamber reaches its maximum volume and ii) a contraction position at which the air compressor chamber reaches its minimum volume;

a combustion cell defining a variable-volume combustion chamber separate from the air compressor chamber, an air intake port, a free exhaust port adapted to communicate with atmosphere, and at least one drive exhaust port arranged in fluid communication with the exhaust gas inlet of the turbocharger, said air intake port, free exhaust port, and drive exhaust port each arranged in separate fluid communication with the combustion chamber;

an air storage chamber arranged in fluid communication between the air exit port of the air compressor cell and the air intake port of the combustion cell;

an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;

a free exhaust valve associated with the free exhaust port of the combustion cell and selectively operable to move between i) a closed position at which the free exhaust valve closes the free exhaust port and thereby closes fluid communication between the combustion chamber and atmosphere via the free exhaust port and ii) an opened position at which the free exhaust valve opens the free exhaust port and thereby opens fluid communication between the combustion chamber and atmosphere via the free exhaust port;

a drive exhaust valve associated with each drive exhaust port of the combustion cell and selectively operable to move between i) a closed position at which the drive exhaust valve closes its respective drive exhaust port and thereby closes fluid communication between the combustion chamber and the exhaust gas inlet of the turbocharger via the respective drive exhaust port and ii) an opened position at which the drive exhaust valve opens its respective drive exhaust port and thereby opens fluid communication between the combustion chamber and the exhaust gas inlet of the turbocharger via the respective drive exhaust port; and a power piston positioned in the combustion chamber and operable to move therein between i) an expansion position at which the combustion chamber reaches its maximum volume and ii) a contraction position at which the combustion chamber reaches its minimum volume.

12. A power module, comprising:

an actuating fluid compressor cell defining a variable-volume actuating fluid compressor chamber and an actuating fluid port arranged in fluid communication with the actuating fluid compressor chamber, said actuating fluid port adapted to communicate with a source of actuating fluid;

an actuating fluid drain passage;

an actuating fluid supply valve arranged in fluid communication between the source of actuating fluid and the actuating fluid port and selectively operable to move between i) a closed position at which the supply valve closes fluid communication between the source of actuating fluid and the actuating fluid compressor chamber via the actuating fluid port and ii) an opened position at which the supply valve opens fluid communication between the source of actuating fluid and the actuating fluid compressor chamber via the actuating fluid port;

an actuating fluid pump piston positioned in the actuating fluid compressor chamber and operable to move therein between i) an expansion position at which the actuating fluid compressor chamber reaches its maximum volume and ii) a contraction position at which the actuating fluid compressor chamber reaches its minimum volume;

a combustion cell defining a variable-volume combustion chamber, separate from the actuating fluid compressor chamber, an air intake port, an exhaust port, and an actuating fluid common rail, said air intake port and exhaust port each arranged in fluid communication with the combustion chamber;

an actuating fluid storage chamber arranged in fluid communication between the actuating fluid port of the actuating fluid compressor cell and the actuating fluid common rail;

a hydraulically-actuatable intake valve associated with the air intake port of the combustion cell and having an actuating fluid chamber and a piston portion positioned in the actuating fluid chamber, said intake valve selectively operable to move between i) a closed position at which the intake valve closes the air intake port and thereby closes fluid communication to the combustion chamber via the air intake port and ii) an opened position at which the intake valve opens the air intake port and thereby opens fluid communication to the combustion chamber via the air intake port;

an electronically-controllable magnetically-latchable first control valve arranged in fluid communication between the actuating fluid common rail and the actuating fluid chamber of the intake valve, said first control valve selectively operable to move between i) a closed position at which the first control valve closes fluid communication between the actuating fluid common rail and the actuating fluid chamber of the intake valve and opens fluid communication between the actuating fluid drain passage and the actuating fluid chamber of the intake valve thereby allowing the intake valve to be moved towards its closed position and ii) an opened position at which the first control valve opens fluid communication between the actuating fluid common rail and the actuating fluid chamber of the intake valve and closes fluid communication between the actuating fluid drain passage and the actuating fluid chamber of the intake valve thereby allowing the intake valve to be hydraulically moved towards its opened position;

a hydraulically-actuatable exhaust valve associated with the exhaust port of the combustion cell and having an actuating fluid chamber and a piston portion positioned in the actuating fluid chamber, said exhaust valve selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port;

an electronically-controllable magnetically-latchable second control valve arranged in fluid communication between the actuating fluid common rail and the actuating fluid chamber of the exhaust valve, said second control valve selectively operable to move between i) a closed position at which the second control valve closes fluid communication between the actuating fluid common rail and the actuating fluid chamber of the exhaust valve and opens fluid communication between the actuating fluid drain passage and the actuating fluid chamber of the exhaust valve thereby allowing the exhaust valve to be moved towards its closed position and ii) an opened position at which the second control valve opens fluid communication between the actuating fluid common rail and the actuating fluid chamber of the exhaust valve and closes fluid communication between the actuating fluid drain passage and the actuating fluid chamber of the exhaust valve thereby allowing the exhaust valve to be hydraulically moved towards its opened position; and a power piston positioned in the combustion chamber and operable to move therein between i) an expansion position at which the combustion chamber reaches its maximum volume and ii) a contraction position at which the combustion chamber reaches its minimum volume.

13. The power module of claim 12, further including a check valve arranged in fluid communication between the actuating fluid port of the actuating fluid compressor cell and the actuating fluid storage chamber, said check valve operable to allow only one-way fluid flow from the actuating fluid compressor chamber to the actuating fluid storage chamber.

14. The power module of claim 12, wherein said actuating fluid supply valve includes a digitally-controlled two-way valve including a movable magnetically-latchable spool having one end portion and an opposite end portion, a closing-direction electrical coil located proximate the one end portion of the spool, and an opening-direction electrical coil located proximate the opposite end portion of the spool, said closing-direction electrical coil selectively operable to electromagnetically pull the spool towards one state corresponding to the closed position of the actuating fluid supply valve, said opening-direction electrical coil selectively operable to electromagnetically pull the spool towards another state corresponding to the opened position of the actuating fluid supply valve.

15. The power module of claim 12, wherein said first and second control valves each include a digitally-controlled three-way valve including a movable magnetically-latchable spool having one end portion and an opposite end portion, a closing-direction electrical coil located proximate the one end portion of the spool, and an opening-direction electrical coil located proximate the opposite end portion of the spool, said closing-direction electrical coil selectively operable to electromagnetically pull the spool towards one state corresponding to the closed position of the respective control valve, said opening-direction electrical coil selectively operable to electromagnetically pull the spool towards another state corresponding to the opened position of the respective control valve.

16. The power module of claim 12, further including an electronic control unit operable to control the selectable operation of each said electronically-controllable valves.

17. The power module of claim 16, further including an actuating fluid pressure sensor operable to i) sense the pressure of actuating fluid in the actuating fluid storage chamber and ii) provide the electronic control unit with an actuating fluid pressure signal indicative of said pressure, said electronic control unit operable to independently control the operation of the actuating fluid supply valve in response to said actuating fluid pressure signal.

18. The power module of claim 16, further including an actuating fluid pressure sensor operable to i) sense the pressure of actuating fluid in the actuating fluid common rail and ii) provide the electronic control unit with an actuating fluid pressure signal indicative of said pressure, said electronic control unit operable to independently control the operation of the first and second control valves in response to said actuating fluid pressure signal.

19. The power module of claim 16, wherein said electronic control unit further independently controls the operation of the first and second control valves in response to at least one sensed parameter selected from the group of ambient air temperature, ambient barometric pressure, inlet air temperature, inlet air pressure, actuating fluid temperature, actuating fluid pressure, throttle position, power piston position, engine brake signals, starter inputs, and ignition switch position.

20. The power module of claim 12, further including an electronically-controllable hydraulically-actuatable fuel injector extending into the combustion chamber and selectively operable to inject fuel therein.

21. The power module of claim 20, wherein said injector includes an actuating fluid chamber, a piston portion positioned in the actuating fluid chamber, a check valve movable between a closed position at which the check valve blocks injection of fuel and an opened position at which the check valve opens injection of fuel, and an electronically-controllable magnetically-latchable third control valve arranged in fluid communication between the actuating fluid common rail and the actuating fluid chamber of the injector, said third control valve selectively operable to move between i) a closed position at which the third control valve closes fluid communication between the actuating fluid common rail and the actuating fluid chamber of the injector and opens fluid communication between the actuating fluid drain passage and the actuating fluid chamber of the injector thereby allowing the check valve of the injector to be moved towards its closed position and ii) an opened position at which the third control valve opens fluid communication between the actuating fluid common rail and the actuating fluid chamber of the injector and closes fluid communication between the actuating fluid drain passage and the actuating fluid chamber of the injector thereby allowing the check valve to be hydraulically moved towards its opened position.

22. The power module of claim 21, wherein said injector is a multiple stage injector.

23. The power module of claim 12, wherein said actuating fluid storage chamber is integrally formed with the actuating fluid compressor cell.

24. The power module of claim 12, wherein said actuating fluid storage chamber is connected to the actuating fluid compressor cell.

25. The power module of claim 12, wherein said intake and exhaust valves each further include a return spring operable to bias the respective valve towards its closed position.

26. The power module of claim 12, wherein the actuating fluid compressor cell and the combustion cell are integrally formed with one another by a common housing.

27. The power module of claim 12, wherein the actuating fluid compressor cell and the combustion cell are connected together as a compact unit.

28. The power module of claim 12, wherein the actuating fluid pump piston and the power piston are movable by a common drive device.

29. A power module, comprising:
an air compressor cell defining a variable-volume air compressor chamber, an air supply port, and an air exit port, said air supply port and air exit port each arranged in fluid communication with the air compressor chamber, said air supply port adapted to communicate with a source of supply air;

an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens tile air supply port and thereby opens fluid communication between the source of supply air and the air compressor chamber via the air supply port;

an air pump piston positioned in the air compressor chamber and operable to move between i) an expansion position at which the air compressor chamber reaches its maximum volume and ii) a contraction position at which the air compressor chamber reaches its minimum volume;

a combustion cell defining a variable-volume combustion chamber, separate from the actuating fluid compressor chamber, an air intake port, an exhaust port, and an actuating fluid common rail, said air intake port and exhaust port each arranged in fluid communication with the combustion chamber;

an air storage chamber arranged in fluid communication between the air exit port of the air compressor cell and the air intake port of the combustion cell;

an air check valve arranged in fluid communication between said air exit port and the air storage chamber, said air check valve operable to allow only one-way fluid flow from the air compressor chamber to the air storage chamber;

an actuating fluid compressor cell defining a variable-volume actuating fluid compressor chamber and an actuating fluid port arranged in fluid communication with the actuating fluid compressor chamber, said actuating fluid port adapted to communicate with a source of actuating fluid;

an actuating fluid drain passage;

an actuating fluid supply valve arranged in fluid communication between the source of actuating fluid and the actuating fluid port and selectively operable to move between i) a closed position at which the actuating fluid supply valve closes fluid communication between the source of actuating fluid and the actuating fluid compressor chamber via the actuating fluid port and ii) an opened position at which the actuating fluid supply valve opens fluid communication between the source of actuating fluid and the actuating fluid compressor chamber via the actuating fluid port;

an actuating fluid pump piston positioned in the actuating fluid compressor chamber and operable to move therein between i) an expansion position at which the actuating fluid compressor chamber reaches its maximum volume and ii) a contraction position at which the actuating fluid compressor chamber reaches its minimum volume;

an actuating fluid storage chamber arranged in fluid communication between the actuating fluid port of the actuating fluid compressor cell and the actuating fluid common rail;

an actuating fluid check valve arranged in fluid communication between the actuating fluid port of the actuating fluid compressor cell and the actuating fluid storage chamber, said actuating fluid check valve operable to allow only one-way fluid flow from the actuating fluid compressor chamber to the actuating fluid storage chamber;

a hydraulically-actuatable intake valve associated with the air intake port of the combustion cell and having an actuating fluid chamber and a piston portion positioned in the actuating fluid chamber, said intake valve selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port;

an electronically-controllable magnetically-latchable first control valve arranged in fluid communication between the actuating fluid common rail and the actuating fluid chamber of the intake valve, said first control valve selectively operable to move between i) a closed position at which the first control valve closes fluid communication between the actuating fluid common rail and the actuating fluid chamber of the intake valve and opens fluid communication between the actuating fluid drain passage and the actuating fluid chamber of the intake valve thereby allowing the intake valve to be moved towards its closed position and ii) an opened position at which the first control valve opens fluid communication between the actuating fluid common rail and the actuating fluid chamber of the intake valve and closes fluid communication between the actuating fluid drain passage and the actuating fluid chamber of the intake valve thereby allowing the intake valve to be hydraulically moved towards its opened position;

a hydraulically-actuatable exhaust valve associated with the exhaust port of the combustion cell and having an actuating fluid chamber and a piston portion positioned in the actuating fluid chamber, said exhaust valve selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port;

an electronically-controllable magnetically-latchable second control valve arranged in fluid communication between the actuating fluid common rail and the actuating fluid chamber of the exhaust valve, said second control valve selectively operable to move between i) a closed position at which the second control valve closes fluid communication between the actuating fluid common rail and the actuating fluid chamber of the exhaust valve and opens fluid communication between the actuating fluid drain passage and the actuating fluid chamber of the exhaust valve thereby allowing the exhaust valve to be moved towards its closed position and ii) an opened position at which the second control valve opens fluid communication between the actuating fluid common rail and the actuating fluid chamber of the exhaust valve and closes fluid communication between the actuating fluid drain passage and the actuating fluid chamber of the exhaust valve thereby allowing the exhaust valve to be hydraulically moved towards its opened position; and a power piston positioned in the combustion chamber and operable to move therein between i) an expansion position at which the combustion chamber reaches its maximum volume and ii) a contraction position at which the combustion chamber reaches its minimum volume.

30. The power module of claim 29, wherein said actuating fluid pump piston is driven by said air pump piston.

31. A power module, comprising:

an air compressor cell defining a variable-volume air compressor chamber, an air supply port, and an air exit port, said air supply port and air exit port each arranged in separate fluid communication with the air compressor chamber, said air supply port adapted to communicate with a source of supply air;

an electronically-controllable magnetically-latchable air supply poppet valve associated with the air supply port, said air supply poppet valve including a magnetically-latchable poppet having an end portion and movable between a closed position and an opened position, a return spring operable to bias the poppet of the air supply poppet valve towards its closed position at which the poppet of the air supply poppet valve closes the air supply port and thereby closes fluid communication between the source of supply air and the air compressor chamber via the air supply port, and an opening-direction electrical coil located proximate the end portion of the poppet, said opening-direction electrical coil selectively operable to electromagnetically pull the poppet of the air supply poppet valve towards its opened position at which the poppet of the air supply poppet valve opens the air supply port and thereby opens fluid communication between the source of supply air and the air compressor chamber via the air supply port;

an air pump piston positioned in the air compressor chamber and operable to reciprocally move between i) an expansion position at which the air compressor chamber reaches its maximum volume and ii) a contraction position at which the air compressor chamber reaches its minimum volume;

a combustion cell defining a variable-volume internal combustion chamber, separate from the actuating fluid compressor chamber, an air intake port, an exhaust port, and an actuating fluid common rail, said air intake port and exhaust port each arranged in separate fluid communication with the combustion chamber;

an air storage chamber arranged in fluid communication between the air exit port of the air compressor cell and the air intake port of the combustion cell;

an air check valve arranged in fluid communication between said air exit port and the air storage chamber, said air check valve operable to allow only one-way fluid flow from the air compressor chamber to the air storage chamber;

an actuating fluid compressor cell defining a variable-volume actuating fluid compressor chamber and an actuating fluid port arranged in fluid communication with the actuating fluid compressor chamber, said actuating fluid port adapted to communicate with a source of actuating fluid;

an actuating fluid drain passage;

an electronically-controllable magnetically-latchable two-way actuating fluid supply valve arranged in fluid communication between the source of actuating fluid and the actuating fluid port, said actuating fluid supply valve including a magnetically-latchable spool having one end portion and an opposite end portion and movable between a closed position and an opened position, a closing-direction electrical coil located proximate the one end portion of the spool, and an opening-direction electrical coil located proximate the opposite end portion of the spool, said closing-direction electrical coil selectively operable to electromagnetically pull the spool of the actuating fluid supply valve towards its closed position at which the spool of the actuating fluid supply valve closes fluid communication between the source of actuating fluid and the actuating fluid compressor chamber via the actuating fluid port, said opening-direction electrical coil selectively operable to electromagnetically pull the spool of the actuating fluid supply valve towards its opened position at which the spool of the actuating fluid supply valve opens fluid communication between the source of actuating fluid and the actuating fluid compressor chamber via the actuating fluid port;

an actuating fluid pump piston positioned in the actuating fluid compressor chamber and operable to reciprocally move therein between i) an expansion position at which the actuating fluid compressor chamber reaches its maximum volume and ii) a contraction position at which the actuating fluid compressor chamber reaches its minimum volume;

an actuating fluid storage chamber arranged in fluid communication between the actuating fluid port of the actuating fluid compressor cell and the actuating fluid common rail;

an actuating fluid check valve arranged in fluid communication between the actuating fluid port of the actuating fluid compressor cell and the actuating fluid storage chamber, said actuating fluid check valve operable to allow only one-way fluid flow from the actuating fluid compressor chamber to the actuating fluid storage chamber;

a hydraulically-actuatable intake poppet valve associated with the air intake port of the combustion cell and having an actuating fluid chamber and a piston portion positioned in the actuating fluid chamber, said intake poppet valve selectively operable to reciprocally move between i) a closed position at which the intake poppet valve closes the air intake port and thereby closes fluid communication between the air storage chamber and the combustion chamber via the air intake port and ii) an opened position at which the intake poppet valve opens the air intake port and thereby opens fluid communication between the air storage chamber and the combustion chamber via the air intake port;

an electronically-controllable magnetically-latchable three-way first control valve arranged in fluid communication between the actuating fluid common rail and the actuating fluid chamber of the intake valve, said first control valve including a magnetically-latchable spool having one end portion and an opposite end portion and movable between a closed position and an opened position, a closing-direction electrical coil located proximate the one end portion of the spool, and an opening-direction electrical coil located proximate the opposite end portion of the spool, said closing-direction electrical coil selectively operable to electromagnetically pull the spool towards its closed position at which the spool of the first control valve closes fluid communication between the actuating fluid common rail and the actuating fluid chamber of the intake poppet valve and opens fluid communication between the actuating fluid drain passage and the actuating fluid chamber of the intake poppet valve thereby allowing the intake poppet valve to be moved towards its closed position, said opening-direction electrical coil selectively operable to electromagnetically pull the spool towards its opened position at which the spool of the first control valve opens fluid communication between the actuating fluid common rail and the actuating fluid chamber of the intake poppet valve and closes fluid communication between the actuating fluid drain passage and the actuating fluid chamber of the intake poppet valve thereby allowing the intake poppet valve to be hydraulically moved towards its opened position;

a hydraulically-actuatable exhaust poppet valve associated with the exhaust port of the combustion cell and having an actuating fluid chamber and a piston portion positioned in the actuating fluid chamber, said exhaust poppet valve selectively operable to reciprocally move between i) a closed position at which the exhaust poppet valve closes the exhaust port and thereby closes fluid communication between the combustion chamber and the exhaust port and ii) an opened position at which the exhaust poppet valve opens the exhaust port and thereby opens fluid communication between the combustion chamber and the exhaust port;

an electronically-controllable magnetically-latchable three-way second control valve arranged in fluid communication between the actuating fluid common rail and the actuating fluid chamber of the exhaust poppet valve, said second control valve including a magnetically-latchable spool having one end portion and an opposite end portion and movable between a closed position and an opened position, a closing-direction electrical coil located proximate the one end portion of the spool, and an opening-direction electrical coil located proximate the opposite end portion of the spool, said closing-direction electrical coil selectively operable to electromagnetically pull the spool towards its closed position at which the spool of the second control valve closes fluid communication between the actuating fluid common rail and the actuating fluid chamber of the exhaust poppet valve and opens fluid communication between the actuating fluid drain passage and the actuating fluid chamber of the exhaust poppet valve thereby allowing the exhaust poppet valve to be moved towards its closed position, said opening-direction electrical coil selectively operable to electromagnetically pull the spool towards its opened position at which the spool of the second control valve opens fluid communication between the actuating fluid common rail and the actuating fluid chamber of the exhaust poppet valve and closes fluid communication between the actuating fluid drain passage and the actuating fluid chamber of the exhaust poppet valve thereby allowing the exhaust poppet valve to be hydraulically moved towards its opened position; and a power piston positioned in the combustion chamber and operable to reciprocally move therein between i) an expansion position at which the combustion chamber reaches its maximum volume and ii) a contraction position at which the combustion chamber reaches its minimum volume.

32. An internal combustion engine, comprising:

a plurality of power modules connected to generate work together wherein each power module separately includes an air compressor cell defining a variable-volume air compressor chamber, an air supply port, and an air exit port, said air supply port and air exit port each arranged in fluid communication with the air compressor chamber, said air supply port adapted to communicate with a source of supply air; an electronically-controllable magnetically-latchable air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port; an air pump piston positioned in the air compressor chamber and operable to move between i) an expansion position at which the air compressor chamber reaches its maximum volume and ii) a contraction position at which the air compressor chamber reaches its minimum volume; a combustion cell defining a variable-volume combustion chamber separate from the air compressor chamber, an air intake port, an exhaust port, and an actuating fluid common rail adapted to be arranged in fluid communication with a source of pressurized actuating fluid, said air intake port and exhaust port each arranged in fluid communication with the combustion chamber; an actuating fluid drain passage; an air storage chamber arranged in fluid communication between the air exit port of the air compressor cell and the air intake port of the combustion cell; a hydraulically-actuatable intake valve associated with the air intake port of the combustion cell and having an actuating fluid chamber and a piston portion positioned in the acting fluid chamber, said intake valve selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port; an electronically-controllable magnetically-latchable first control valve arranged in fluid communication between the actuating fluid common rail and the actuating fluid chamber of the intake valve, said first control valve selectively operable to move between i) a closed position at which the first control valve closes fluid communication between the actuating fluid common rail and the actuating fluid chamber of the intake valve and opens fluid communication between the actuating fluid drain passage and the actuating fluid chamber of the intake valve thereby allowing the intake valve to be moved towards its closed position and ii) an opened position at which the first control valve opens fluid communication between the actuating fluid common rail and the actuating fluid chamber of the intake valve and closes fluid communication between the actuating fluid drain passage and the actuating fluid chamber of the intake valve thereby allowing the intake valve to be hydraulically moved towards its opened position; a hydraulically-actuatable exhaust valve associated with the exhaust port of the combustion cell and having an actuating fluid chamber and a piston portion positioned in the actuating fluid chamber, said exhaust valve selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; an electronically-controllable magnetically-latchable second control valve arranged in fluid communication between the actuating fluid common rail and the actuating fluid chamber of the exhaust valve, said second control valve selectively operable to move between i) a closed position at which the second control valve closes fluid communication between the actuating fluid common rail and the actuating fluid chamber of the exhaust valve and opens fluid communication between the actuating fluid drain passage and the actuating fluid chamber of the exhaust valve thereby allowing the exhaust valve to be moved towards its closed position and ii) an opened position at which the second control valve opens fluid communication between the actuating fluid common rail and the actuating fluid chamber of the exhaust valve and closes fluid communication between the actuating fluid drain passage and the actuating fluid chamber of the exhaust valve thereby allowing the exhaust valve to be hydraulically moved towards its opened position; and a power piston positioned in the respective combustion chamber and operable to move therein between i) an expansion position at which the respective combustion chamber reaches its maximum volume and ii) a contraction position at which the respective combustion chamber reaches its minimum volume; wherein said air compressor chamber and air storage chamber of each power module are isolated from fluid communication and independently operable with respect to the air compressor chamber and air storage chamber of any other said power module of the internal combustion engine.

33. The internal combustion engine of claim 32, wherein the air compressor cell and combustion cell of each power module are located adjacent to one another.

34. The internal combustion engine of claim 32, wherein said power modules are arranged substantially in-line relative to one another.

35. The internal combustion engine of claim 32, wherein the air compressor cells are arranged in an alternating and substantially in-line pattern with respect to the combustion cells.

36. An internal combustion engine, comprising:
a plurality of power modules connected to generate work together wherein each power module separately includes an air compressor cell defining a variable-volume air compressor chamber, an air supply port, and an air exit port, said air supply port and air exit port each arranged in fluid communication with the air compressor chamber, said air supply port adapted to communicate with a source of supply air; an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port; an air pump piston positioned in the air compressor chamber and operable to move between i) an expansion position at which the air compressor chamber reaches its maximum volume and ii) a contraction position at which the air compressor chamber reaches its minimum volume; a combustion cell defining a variable-volume combustion chamber separate from the air compressor chamber, an air intake port, and an exhaust port, said air intake port and exhaust port each arranged in fluid communication with the combustion chamber; an air storage chamber arranged in fluid communication between the air exit port of the air compressor cell and the air intake port of the combustion cell; an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port; an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the respective combustion chamber and operable to move therein between i) an expansion position at which the respective combustion chamber reaches its maximum volume and ii) a contraction position at which the respective combustion chamber reaches its minimum volume; wherein said air compressor chamber and air storage chamber of each power module are isolated from fluid communication and independently operable with respect to the air compressor chamber and air storage chamber of any other said power module of the internal combustion engine, further including a separate electronic control unit associated with each power module, each electronic control unit operable to selectively and independently control the operation of the respective air supply valve with digital pulses of electrical current.

37. The internal combustion engine of claim 36, further including an air pressure sensor associated with each power module, said air pressure sensor operable to sense the pressure of air in the respective air storage chamber and provide the respective electronic control unit with a signal indicative of such pressure, said respective electronic control unit operable to move the respective air supply valve to its opened position in response to said pressure being below a threshold air pressure, said respective electronic control unit operable to move the respective air supply valve to its closed position in response to said pressure being at least the threshold air pressure.

38. An internal combustion engine, comprising:
a plurality of power modules connected to generate work together wherein each power module separately includes an air compressor cell defining a variable-volume air compressor chamber, an air supply port, and an air exit port, said air supply port and air exit port each arranged in fluid communication with the air compressor chamber, said air supply port adapted to communicate with a source of supply air; an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port; an air pump piston positioned in the air compressor chamber and operable to move between i) an expansion position at which the air compressor chamber reaches its maximum volume and ii) a contraction position at which the air compressor chamber reaches its minimum volume; a combustion cell defining a variable-volume combustion chamber separate from the air compressor chamber, an air intake port, and an exhaust port, said air intake port and exhaust port each arranged in fluid communication with the combustion chamber; an air storage chamber arranged in fluid communication between the air exit port of the air compressor cell and the air intake port of the combustion cell; an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port; an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the respective combustion chamber and operable to move therein between i) an expansion position at which the respective combustion chamber reaches its maximum volume and ii) a contraction position at which the respective combustion chamber reaches its minimum volume; wherein said air compressor chamber and air storage chamber of each power module are isolated from fluid communication and independently operable with respect to the air compressor chamber and air storage chamber of any other said power module of the internal combustion engine, further including a separate electronic control unit associated with each power module wherein each electronic control unit is operable to selectively and independently control the operation of the respective air supply valve in response to at least one sensed parameter selected from the group of air temperature, air manifold pressure, actuating fluid temperature, actuating fluid pressure, barometric pressure, throttle position, power piston position, engine brake signals, starter inputs, and ignition switch position.

39. An internal combustion engine, comprising:

a plurality of power modules connected to generate work together wherein each power module separately includes an actuating fluid compressor cell defining a variable-volume actuating fluid compressor chamber and an actuating fluid port arranged in fluid communication with the actuating fluid compressor chamber, said actuating fluid port adapted to communicate with a source of actuating fluid; an actuating fluid drain passage; an actuating fluid supply valve arranged in fluid communication between the source of actuating fluid and the actuating fluid port and selectively operable to move between i) a closed position at which the actuating fluid supply valve closes fluid communication between the source of actuating fluid and the actuating fluid compressor chamber via the actuating fluid port and ii) an opened position at which the actuating fluid supply valve opens fluid communication between the source of actuating fluid and the actuating fluid compressor chamber via the actuating fluid port; an actuating fluid pump piston positioned in the actuating fluid compressor chamber and operable to move therein between i) an expansion position at which the actuating fluid compressor chamber reaches its maximum volume and ii) a contraction position at which the actuating fluid compressor chamber reaches its minimum volume; a combustion cell defining a variable-volume combustion chamber, separate from the actuating fluid compressor chamber, an air intake port, an exhaust port, and an actuating fluid common rail, said air intake port and exhaust port each arranged in fluid communication with the combustion chamber; an actuating fluid storage chamber arranged in fluid communication between the actuating fluid port of the actuating fluid compressor cell and the actuating fluid common rail; a hydraulically-actuatable intake valve associated with the air intake port of the combustion cell and having an actuating fluid chamber and a piston portion positioned in the actuating fluid chamber, said intake valve selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port; an electronically-controllable magnetically-latchable first control valve arranged in fluid communication between the actuating fluid common rail and the actuating fluid chamber of the intake valve, said first control valve selectively operable to move between i) a closed position at which the first control valve closes fluid communication between the actuating fluid common rail and the actuating fluid chamber of the intake valve and opens fluid communication between the actuating fluid drain passage and the actuating fluid chamber of the intake valve thereby allowing the intake valve to be moved towards its closed position and ii) an opened position at which the first control valve opens fluid communication between the actuating fluid common rail and the actuating fluid chamber of the intake valve and closes fluid communication between the actuating fluid drain passage and the actuating fluid chamber of the intake valve thereby allowing the intake valve to be hydraulically moved towards its opened position; a hydraulically-actuatable exhaust valve associated with the exhaust port of the combustion cell and having an actuating fluid chamber and a piston portion positioned in the actuating fluid chamber, said exhaust valve selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; an electronically-controllable magnetically-latchable second control valve arranged in fluid communication between the actuating fluid common rail and the actuating fluid chamber of the exhaust valve, said second control valve selectively operable to move between i) a closed position at which the second control valve closes fluid communication between the actuating fluid common rail and the actuating fluid chamber of the exhaust valve and opens fluid communication between the actuating fluid drain passage and the actuating fluid chamber of the exhaust valve thereby allowing the exhaust valve to be moved towards its closed position and ii) an opened position at which the second control valve opens fluid communication between the actuating fluid common rail and the actuating fluid chamber of the exhaust valve and closes fluid communication between the actuating fluid drain passage and the actuating fluid chamber of the exhaust valve thereby allowing the exhaust valve to be hydraulically moved towards its opened position; and a power piston positioned in the combustion chamber and operable to move therein between i) an expansion position at which the combustion chamber reaches its maximum volume and ii) a contraction position at which the combustion chamber reaches its minimum volume; wherein said actuating fluid compressor chamber and actuating fluid storage chamber of each power module are isolated from fluid communication and independently operable with respect to the actuating fluid compressor chamber and actuating fluid storage chamber of any other said power module of the internal combustion engine.

40. The internal combustion engine of claim 39, wherein said actuating fluid compressor cell and combustion cell of each power module are located adjacent to one another.

41. The internal combustion engine of claim 39, wherein said power modules are arranged substantially in-line relative to one another.

42. The internal combustion engine of claim 39, wherein the actuating fluid compressor cells are arranged in an alternating and substantially in-line pattern with respect to the combustion cells.

43. A two-stroke cycle power module, comprising:
 a rotatable crankshaft;
 a combustion chamber;
 an actuating fluid drain passage;
 an actuating fluid common rail adapted to be arranged in fluid communication with a source of pressurized actuating fluid;
 a movable power piston positioned in the combustion chamber and coupled to the crankshaft for movement therewith;
 an electronically-controllable hydraulically-actuatable intake valve having an
 actuating fluid chamber and a piston portion positioned in the actuating fluid chamber, said intake valve selectively operable to admit air into the combustion chamber;
 an electronically-controllable magnetically-latchable first control valve arranged in fluid communication between the actuating fluid common rail and the actuating fluid chamber of the intake valve, said first control valve selectively operable to move between i) a closed position at which the first control valve closes fluid communication between the actuating fluid common rail and the actuating fluid chamber of the intake valve and opens fluid communication between the actuating fluid drain passage and the actuating fluid chamber of the intake valve thereby allowing the intake valve to be moved towards its closed position and ii) an opened position at which the first control valve opens fluid communication between the actuating fluid common rail and the actuating fluid chamber of the intake valve and closes fluid communication between the actuating fluid drain passage and the actuating fluid chamber of the intake valve thereby allowing the intake valve to be hydraulically moved towards its opened position;
 an electronically-controllable hydraulically-actuatable exhaust valve having an actuating fluid chamber and a piston portion positioned in the actuating fluid chamber, said exhaust valve selectively operable to vent exhaust gas from the combustion chamber;
 an electronically-controllable magnetically-latchable second control valve arranged in fluid communication between the actuating fluid common rail and the actuating fluid chamber of the exhaust valve, said second control valve selectively operable to move between i) a closed position at which the second control valve closes fluid communication between the actuating fluid common rail and the actuating fluid chamber of the exhaust valve and opens fluid communication between the actuating fluid drain passage and the actuating fluid chamber of the exhaust valve thereby allowing the exhaust valve to be moved towards its closed position and ii) an opened position at which the second control valve opens fluid communication between the actuating fluid common rail and the actuating fluid chamber of the exhaust valve and closes fluid communication between the actuating fluid drain passage and the actuating fluid chamber of the exhaust valve thereby allowing the exhaust valve to be hydraulically moved towards its opened position
 an electronically-controllable hydraulically-actuatable fuel injector extending into the combustion chamber and selectively operable to inject fuel therein, wherein said injector includes an actuating fluid chamber, a piston portion positioned in the actuating fluid chamber, a check valve movable between a closed position at which the check valve blocks injection of fuel and an opened position at which the check valve opens injection of fuel, and an electronically-controllable magnetically-latchable third control valve arranged in fluid communication between the actuating fluid common rail and the actuating fluid chamber of the injector, said third control valve selectively operable to move between i) a closed position at which the third control valve closes fluid communication between the actuating fluid common rail and the actuating fluid chamber of the injector and opens fluid communication between the actuating fluid drain passage and the actuating fluid chamber of the injector thereby allowing the check valve of the injector to be moved towards its closed position and ii) an opened position at which the third control valve opens fluid communication between the actuating fluid common rail and the actuating fluid chamber of the injector and closes fluid communication between the actuating fluid drain passage and the actuating fluid chamber of the injector thereby allowing the check valve to be hydraulically moved towards its opened position, wherein said crankshaft is selectively rotatable in one angular direction and a reverse angular direction in response to selectable timing and sequence of operation of the intake and exhaust valves and the fuel injector relative to the position of the power piston.

44. A method of operating a two-stroke cycle power module having a rotatable crankshaft; an air compressor cell defining a variable-volume air compressor chamber, an air supply port, and an air exit port, said air supply port and air exit port each arranged in fluid communication with the air compressor chamber, said air supply port adapted to communicate with a source of supply air; an air supply valve associated with the air supply port and selectively operable to move between i) a closed position at which the air supply valve closes the air supply port and thereby closes fluid communication between the source of supply air and the air compressor chamber via the air supply port and ii) an opened position at which the air supply valve opens the air supply port and thereby opens fluid communication between the source of supply air and the air compressor chamber via the air supply port; an air pump piston positioned in the air compressor chamber and operable to move between i) an expansion position at which the air compressor chamber reaches its maximum volume and ii) a contraction position at which the air compressor chamber reaches its minimum volume; a combustion cell defining a variable-volume combustion chamber separate from the air compressor chamber, an air intake port, and an exhaust port, said air intake port and exhaust port each arranged in fluid communication with the combustion chamber; an air storage chamber arranged in fluid communication between the air exit port of the air compressor cell and the air intake port of the combustion cell; an intake valve associated with the air intake port of the combustion cell and selectively operable to move between i) a closed position at which the intake valve closes the air intake port and thereby closes fluid communication between the air storage chamber and the combustion chamber via the air intake port and ii) an opened position at which the intake valve opens the air intake port and thereby opens fluid communication between the air storage chamber and the combustion chamber via the air intake port; an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and a power piston positioned in the combustion chamber and coupled to the crankshaft for movement therewith, said power piston operable to move in the combustion chamber between i) an expansion position at which the combustion chamber reaches its maximum volume corresponding to a 180° angular position of the crankshaft and ii) a contraction position at which the combustion chamber reaches its minimum volume corresponding to a 0° angular position of the crankshaft, said method comprising the steps of:

moving the power piston from its contraction position and towards its expansion position;

opening the exhaust valve when the power piston has been moved to a first position corresponding to a first angular position of the crankshaft;

opening the intake valve when the power piston has been moved to a second position corresponding to a second angular position of the crankshaft;

moving the power piston to its expansion position;

moving the power piston from its expansion position and towards its contraction position;

closing the exhaust valve when the power piston has been moved to a third position corresponding to a third angular position of the crankshaft;

closing the intake valve when the power piston has been moved to a fourth position corresponding to a fourth angular position of the crankshaft; and moving the power piston to its contraction position.

45. The method of claim 44, wherein the angular distance between the first and fourth angular positions is about 80°.

46. The method of claim 44, wherein the first angular position of the crankshaft is about 140°, the second angular position of the crankshaft is about 160°, the third angular position of the crankshaft is about 200°, and the fourth angular position of the crankshaft is about 220°.

47. The method of claim 44, wherein during operation of the power module the combustion chamber has a peak fluid pressure of about 13,790 kPa (about 2000 psi) when the power piston is at its contraction position.

48. The method of claim 44, wherein during operation of the power module the combustion chamber has a residual fluid pressure greater than atmospheric pressure when the power piston is at its expansion position.

49. The method of claim 48, wherein the residual fluid pressure in the combustion chamber is at least about 138 kPa (about 20 psi).

50. The method of claim 48, wherein the residual fluid pressure in the combustion chamber is in the range of about 138 to 207 kPa (about 20 to 30 psi).

51. A power module, comprising:

an actuating fluid compressor cell defining a variable-volume actuating fluid compressor chamber and an actuating fluid port arranged in fluid communication with the actuating fluid compressor chamber, said actuating fluid port adapted to communicate with a source of actuating fluid;

an actuating fluid drain passage;

an actuating fluid supply valve arranged in fluid communication between the source of actuating fluid and the actuating fluid port and selectively operable to move between i) a closed position at which the supply valve closes fluid communication between the source of actuating fluid and the actuating fluid compressor chamber via the actuating fluid port and ii) an opened position at which the supply valve opens fluid communication between the source of actuating fluid and the actuating fluid compressor chamber via the actuating fluid port;

an actuating fluid pump piston positioned in the actuating fluid compressor chamber and operable to move therein between i) an expansion position at which the actuating fluid compressor chamber reaches its maximum volume and ii) a contraction position at which the actuating fluid compressor chamber reaches its minimum volume;

a combustion cell defining a variable-volume combustion chamber, separate from the actuating fluid compressor chamber, an air intake port, an exhaust port, and an actuating fluid common rail, said air intake port and exhaust port each arranged in fluid communication with the combustion chamber;

an actuating fluid storage chamber arranged in fluid communication between the actuating fluid port of the actuating fluid compressor cell and the actuating fluid common rail;

an intake valve associated with the air intake port of the combustion cell and operable to move between i) a closed position at which the intake valve closes the air intake port and thereby closes fluid communication to the combustion chamber via the air intake port and ii) an opened position at which the intake valve opens the air intake port and thereby opens fluid communication to the combustion chamber via the air intake port;

an exhaust valve associated with the exhaust port of the combustion cell and selectively operable to move between i) a closed position at which the exhaust valve closes the exhaust port and thereby closes fluid communication between the combustion chamber and the exhaust port and ii) an opened position at which the exhaust valve opens the exhaust port and thereby opens fluid communication between the combustion chamber and the exhaust port; and an electronically-controllable hydraulically-actuatable fuel injector extending into the combustion chamber and selectively operable to inject fuel therein, said fuel injector including an actuating fluid chamber, a piston portion positioned in the actuating fluid chamber, a check valve movable between a closed position at which the check valve blocks injection of fuel and an opened position at which the check valve opens injection of fuel, and an electronically-controllable fluid control valve arranged in fluid communication between the actuating fluid common rail and the actuating fluid chamber of the injector, said control valve selectively operable to move between i) a closed position at which the control valve closes fluid communication between the actuating fluid common rail and the actuating fluid chamber of the injector and opens fluid communication between the actuating fluid drain passage and the actuating fluid chamber of the injector thereby allowing the check valve of the injector to be moved towards its closed position and ii) an opened position at which the control valve opens fluid communication between the actuating fluid common rail and the actuating fluid chamber of the injector and closes fluid communication between the actuating fluid drain passage and the actuating fluid chamber of the injector thereby allowing the check valve to be hydraulically moved towards its opened position; and a power piston positioned in the combustion chamber and operable to move therein between i) an expansion position at which the combustion chamber reaches its maximum volume and ii) a contraction position at which the combustion chamber reaches its minimum volume.

52. The power module of claim 51, wherein said control valve is magnetically latchable in at least one of its closed and opened positions.

53. The power module of claim 51, further including a check valve arranged in fluid communication between the actuating fluid port of the actuating fluid compressor cell and the actuating fluid storage chamber, said check valve operable to allow only one-way fluid flow from the actuating fluid compressor chamber to the actuating fluid storage chamber.

54. The power module of claim 51, wherein said actuating fluid supply valve includes a digitally-controlled two-way valve including a movable magnetically-latchable spool having one end portion and an opposite end portion, a closing-direction electrical coil located proximate the one end portion of the spool, and an opening-direction electrical coil located proximate the opposite end portion of the spool, said closing-direction electrical coil selectively operable to electromagnetically pull the spool towards one state corresponding to the closed position of the actuating fluid supply valve, said opening-direction electrical coil selectively operable to electromagnetically pull the spool towards another state corresponding to the opened position of the actuating fluid supply valve.

55. The power module of claim 51, further including an electronic control unit operable to control the selectable operation of said electronically-controllable fluid control valve.

56. The power module of claim 55, further including an actuating fluid pressure sensor operable to i) sense the pressure of actuating fluid in the actuating fluid storage chamber and ii) provide the electronic control unit with an actuating fluid pressure signal indicative of said pressure, said electronic control unit operable to independently control the operation of the actuating fluid supply valve in response to said actuating fluid pressure signal.

57. The power module of claim 51, wherein said injector is a multiple stage injector.

58. The power module of claim 51, wherein said actuating fluid storage chamber is integrally formed with the actuating fluid compressor cell.

59. The power module of claim 51, wherein said actuating fluid storage chamber is connected to the actuating fluid compressor cell.

60. The power module of claim 51, wherein said intake and exhaust valves each further include a return spring operable to bias the respective valve towards its closed position.

61. The power module of claim 51, wherein the actuating fluid compressor cell and the combustion cell are integrally formed with one another by a common housing.

62. The power module of claim 51, wherein the actuating fluid compressor cell and the combustion cell are connected together as a compact unit.

63. The power module of claim 51, wherein the actuating fluid pump piston and the power piston are movable by a common drive device.

* * * * *

UNITED STATES PATENT AND TRADEMARK OFFICE
CERTIFICATE OF CORRECTION

| | | |
|---|---|---|
| PATENT NO. | : 6,415,749 B1 | |
| APPLICATION NO. | : 09/301004 | |
| DATED | : July 9, 2002 | |
| INVENTOR(S) | : Oded E. Sturman et al. | |

It is certified that error appears in the above-identified patent and that said Letters Patent is hereby corrected as shown below:

On the title page:
In Item [56], U.S. Patent Documents, please insert:
--3,209,737 10/05/1965 Omotehara et al. 123/90
3,532,121 10/06/1970 Sturman et al. 137/625.4
3,683,239 08/08/1972 Sturman 317/154
3,743,898 07/03/1973 Sturman 317/154
4,396,037 08/02/1983 Wilcox 137/625.65
4,409,638 10/11/1983 Sturman et al. 361/152
4,887,562 12/19/1989 Wakeman 123/90.12
4,930,464 06/05/1990 Letsche 123/90.12
5,003,937 04/02/1991 Matsumoto et al. 123/90.12
5,022,358 06/11/1991 Richeson 123/90.12
5,124,598 06/23/1992 Kawamura 310/30
5,170,755 12/15/1992 Kano et al. 123/90.17
5,193,495 03/16/1993 Wood, III 123/90.12
5,209,453 05/11/1993 Aota et al. 251/57
5,224,683 07/06/1993 Richeson 251/30.01
5,237,976 08/24/1993 Lawrence et al. 123/508
5,248,123 09/28/1993 Richeson et al. 251/29
5,255,641 10/26/1993 Schechter 123/90.11
5,275,136 01/04/1994 Schechter et al. 123/90.12
5,327,856 07/12/1994 Schroeder et al. 123/90.12
5,335,633 08/09/1994 Thien 123/90.12
5,339,777 08/23/1994 Cannon 123/90.12
5,367,990 11/29/1994 Schechter 123/90.12
5,373,817 12/20/1994 Schechter et al. 123/90.12
5,410,994 05/02/1995 Schechter 123/90.12
5,448,973 09/12/1995 Meyer 123/90.12
5,460,329 10/24/1995 Sturman 239/96--

In Item [56], U.S. Patent Documents, please insert:
--5,471,959 12/05/1995 Sturman 123/90.12
5,494,219 02/27/1996 Maley et al. 239/88
5,507,316 04/16/1996 Meyer 137/625.65
5,577,468 11/26/1996 Weber 123/90.12
5,598,871 02/04/1997 Sturman et al. 137/625.65
5,622,152 04/22/1997 Ishida 123/446
5,628,293 05/13/1997 Gibson et al. 123/446

UNITED STATES PATENT AND TRADEMARK OFFICE
CERTIFICATE OF CORRECTION

PATENT NO.       : 6,415,749 B1
APPLICATION NO.  : 09/301004
DATED            : July 9, 2002
INVENTOR(S)      : Oded E. Sturman et al.

It is certified that error appears in the above-identified patent and that said Letters Patent is hereby corrected as shown below:

5,638,781 06/17/1997 Sturman 123/90.12
    5,640,987 06/24/1997 Sturman 137/1
    5,673,669 10/07/1997 Maley et al. 123/446
    5,700,136 12/23/1997 Sturman 123/270
    5,713,316 02/03/1998 Sturman 123/90.12
    5,720,261 02/24/1998 Sturman et al. 123/446
    5,813,841 09/29/1998 Sturman 417/446
    5,829,396 11/03/1998 Sturman 123/90.12--

In Item [56], under Other Documents, please insert:
  --"Breakthrough in Digital Valves" by Sturman et al. (Sturman Industries, Inc.) reprinted from Machine Design pp. 37-40, 42, February 21, 1994
    SAE Paper No. 960581 "Camless Engine" by Schechter et al. (Ford Research Lab) February 26, 1996
    "Developments in Digital Valve Technology" by Rob Wilson reprint from Diesel Progress North American Edition pp. 76, 78-79 April 1997
    SAE Paper No. 970248 "Dynamic Model of a Springless Electrohydraulic Valvetrain" by Kim et al. (U. of Illinois and Ford Research Company) 1997
    SAE paper no. 981029 "Adaptive Lift Control for a Camless Electrohydraulic Valvetrain" by Anderson et al. (U. of Illinois and Ford Motor Co.) February 23, 1998--

In Item [56], under Other Documents, please insert
  --SAE Paper No. 1999-01-0196 "Application of Digital Valve Technology to Diesel Fuel Injection" by Cole et al. (Sturman Industries, Inc.) March 1, 1999
    SAE paper No. 1999-01-0825 "Digital Valve Technology Applied to the Control of an Hydraulic Valve Actuator" by Misovec et al. (Sturman Industries, Inc.) March 1, 1999
    "A New Generation of Two-Stroke Engines for the Year 2000" by Duret, A New Generation of Two-Stroke Engines for the Future? Paris, 1993, pp. 181-194
    "Development of New Two-Stroke Engine with Poppet-Valves: Toyota S-2 Engine" by Duret, A New Generation of Two Stroke Engines for the Future? Paris, 1993, pp. 53-62
    "Twenty Years of Piaggio Direct Injection Research to Mass Produced Solution for Small 2T SI Engines" by Nuti et al., Two-Stroke Engines and Emissions, SAE Publication SP-1327, 1998, pp. 65-78
    Design and Simulation of Two-Stroke Engines by Blair, SAE Publications No. R-161, pp. 1-48

UNITED STATES PATENT AND TRADEMARK OFFICE
CERTIFICATE OF CORRECTION

PATENT NO. : 6,415,749 B1
APPLICATION NO. : 09/301004
DATED : July 9, 2002
INVENTOR(S) : Oded E. Sturman et al.

It is certified that error appears in the above-identified patent and that said Letters Patent is hereby corrected as shown below:

Diesel Engine Reference Book Second Edition by Challen, SAE Publication No. R-183, pp. 27-71
"Characteristics of Scavenging Flow in A Poppet-Valve Type 2-Stroke Diesel Engine by Using RSSV System", Progress in Two-Stroke Engine and Emissions Control, SAE Publication SP-1131, 1998, pp. 93-101
NOx Control in Heavy-Duty Diesel Engines – What is the Limit?" In-Cylinder Particulate and NOx Control, SAE Publication No. SP-1326, 1998, pp. 9-20
"Stratified Diesel Fuel-Water-Diesel Fuel Injection Combined with EGR-The Most Efficient In-Cylinder NOx and PM Reduction Technology", Combustion and Emissions in Diesel Engines, SAE Publication No. Sp-1299, 1997, pp. 39-44
Vehicle and Engine Technology Second Edition by Hiesler, SAE International, London, 1999, pp. 292-308
U.S. Appln. No. 08/712,208 filed 07/21/1998 HYDRAULICALLY CONTROLLED CAMLESS VALVE SYSTEM FOR AN INTERNAL COMBUSTION ENGINE (Sturman)
U.S. Appln. No. 08/799,296 filed 02/13/1997 A CONTROL MODULE FOR CONTROLLING HYDRAULICALLY ACTUATED INTAKE/EXHAUST VALVES AND FUEL INJECTOR (Sturman)
U.S. Appln. No. 08/899,801 filed 07/24/1997 HYDRAULIC ACTUATOR FOR AN INTERNAL COMBUSTION ENGINE (Sturman)--

In Item [56], under Other Documents, please insert:
--U.S. Appln. No 09/026,627 filed 02/20/1998 PULSED-ENERGY CONTROLLERS AND METHODS OF OPERATION THEREOF (North)--

Signed and Sealed this

Twenty-eighth Day of April, 2009

JOHN DOLL
*Acting Director of the United States Patent and Trademark Office*

(12) EX PARTE REEXAMINATION CERTIFICATE (7113th)
United States Patent
Sturman et al.

(10) Number: US 6,415,749 C1
(45) Certificate Issued: Oct. 20, 2009

(54) POWER MODULE AND METHODS OF OPERATION

(76) Inventors: Oded E. Sturman, One Innovation Way, Woodland Park, CO (US) 80863; Richard J. Dunn, 128 Valley Cir., Florissant, CO (US) 80816

Reexamination Request:
No. 90/008,753, Jul. 16, 2007

Reexamination Certificate for:
Patent No.: 6,415,749
Issued: Jul. 9, 2002
Appl. No.: 09/301,004
Filed: Apr. 27, 1999

(51) Int. Cl.
*F02B 33/22* (2006.01)
*F01L 9/02* (2006.01)

(52) U.S. Cl. .................. 123/70 R; 123/90.12; 123/446
(58) Field of Classification Search .................. None
See application file for complete search history.

(56) References Cited

U.S. PATENT DOCUMENTS

| | | | | | |
|---|---|---|---|---|---|
| 1,062,999 A | * | 5/1913 | Webb | ................. | 60/626 |
| 2,058,705 A | * | 10/1936 | Maniscalco | ................. | 123/72 |
| 3,623,463 A | * | 11/1971 | De Vries | ................. | 12/70 R |
| 4,779,582 A | * | 10/1988 | Lequesne | ................. | 123/90.11 |
| 4,783,966 A | * | 11/1988 | Aldrich | ................. | 60/622 |
| 5,121,730 A | * | 6/1992 | Ausman et al. | ................. | 123/467 |
| 5,546,897 A | * | 8/1996 | Brackett | ................. | 123/70 R |
| 5,638,781 A | * | 6/1997 | Lequesne | ................. | 123/90.12 |

OTHER PUBLICATIONS

"Cat's Heui System: A look at the future?", Diesel Progress Engineers & Drives, Apr. 1995.*
"Breakthrough in Digital Valves", Machine Design, Feb. 21, 1994.*

* cited by examiner

*Primary Examiner*—Joseph A. Kaufman

(57) ABSTRACT

Herein disclosed is a power module comprising an air compressor chamber, an air supply valve operable to control air flow to the air compressor chamber, a combustion chamber separate from the air compressor chamber, an air storage chamber arranged between the air compressor chamber and the combustion chamber, an actuating fluid common rail, an actuating fluid compressor chamber, an actuating fluid supply valve operable to control actuating fluid flow to the actuating fluid compressor chamber, an actuating fluid storage chamber arranged between the actuating fluid compressor chamber and the actuating fluid common rail, a hydraulically-actuatable intake valve operable to control air flow to the combustion chamber, and a hydraulically-actuatable exhaust valve operable to control exhaust gas flow from the combustion chamber. Among other things, the power module provides significantly more power output than a conventional internal combustion engine of similar size.

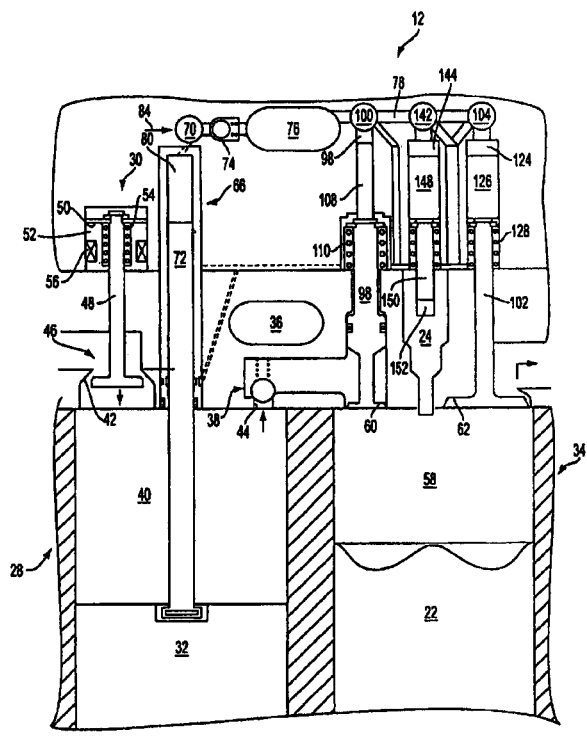

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 51–63 is confirmed.

Claims 1, 4, 9, 10, 38 and 44 are cancelled.

New claims 64–66 are added and determined to be patentable.

Claims 2, 3, 5–8, 11–37, 39–43 and 45–50 were not reexamined.

*64. The power module of claim 1, further including an air pressure sensor coupled to said air storage chamber and to said air supply valve, said air pressure sensor operable to sense the pressure of air in the air storage chamber and provide the electronic control unit with a signal indicative of such pressure, said electronic control unit operable to move the air supply valve to its opened position in response to said pressure being below a threshold air pressure, said electronic control unit operable to move the air supply valve to its closed position in response to said pressure being at least the threshold air pressure.*

*65. The power module of claim 4, further including an air pressure sensor coupled to said air storage chamber and to said air supply valve, said air supply valve operable to move to its opened position in response to said pressure being below a threshold air pressure and to move to its closed position in response to said pressure being at least the threshold air pressure.*

*66. The power module of claim 9, further including an air pressure sensor coupled to said air storage chamber and to said air supply valve, said air supply valve operable to move to its opened position in response to said pressure being below a threshold air pressure and to move to its closed position in response to said pressure being at least the threshold air pressure.*

* * * * *